(12) United States Patent
Lablans

(10) Patent No.: US 12,476,789 B1
(45) Date of Patent: Nov. 18, 2025

(54) COMPUTATIONAL FUNCTION TRANSFORMATION (CFT) IN COMPUTER IMPLEMENTED CRYPTOGRAPHY

(71) Applicant: Peter Lablans, Morris Township, NJ (US)

(72) Inventor: Peter Lablans, Morris Township, NJ (US)

( * ) Notice: Subject to any disclaimer, the term of this patent is extended or adjusted under 35 U.S.C. 154(b) by 0 days.

(21) Appl. No.: 19/076,781

(22) Filed: Mar. 11, 2025

Related U.S. Application Data

(63) Continuation-in-part of application No. 18/741,663, filed on Jun. 12, 2024.
(60) Provisional application No. 63/726,453, filed on Nov. 29, 2024, provisional application No. 63/573,331, filed on Apr. 2, 2024, provisional application No. 63/747,282, filed on Jan. 20, 2025.

(51) Int. Cl.
*H04L 9/06* (2006.01)
*H04L 9/00* (2022.01)
(52) U.S. Cl.
CPC ............ *H04L 9/0631* (2013.01); *H04L 9/006* (2013.01)
(58) Field of Classification Search
CPC .............................. H04L 9/0631; H04L 9/006
See application file for complete search history.

(56) References Cited

U.S. PATENT DOCUMENTS

| | | | | |
|---|---|---|---|---|
| 3,818,452 A * | 6/1974 | Greer | ............... | H03K 19/17712 326/38 |
| 3,958,081 A * | 5/1976 | Ehrsam | ................. | H04L 9/0625 380/37 |
| 3,962,539 A * | 6/1976 | Ehrsam | ................. | H04L 9/0625 380/37 |
| 4,165,444 A * | 8/1979 | Gordon | ................. | H04L 9/0662 380/265 |
| 4,987,324 A * | 1/1991 | Wong | ............... | H03K 19/09429 326/27 |

(Continued)

FOREIGN PATENT DOCUMENTS

EP 2779522 B1 7/2017

OTHER PUBLICATIONS

Ali et al. Modified Advanced Encryption Standard algorithm for fast transmitted data protection. 2020 IOP Conf. Ser.: Mater. Sci. Eng. 928 032011.

(Continued)

*Primary Examiner* — Jason Chiang

(57) ABSTRACT

Data is processed by cryptographic operations selected from encryption, decryption, hashing, and public key exchange (PKI). Data elements are processed as n-state data elements with n an integer at least greater than 3 based on an n-state reversible n-state inverter. The n-state reversible inverter is a self-propagating n-state inverter generating different other n-state reversible inverters. The n-state reversible inverter is derived from a sequence of n n-state data elements with at least a first n-state data element occurring at least twice in different positions in the sequence and a second n-state data element not occurring. The n-state reversible inverter is created from the sequence of n-state data elements. A sequence of n n-state elements is created from a set of k n-state elements with k smaller than n. The k n-state elements are provided by a public key exchange method.

20 Claims, 12 Drawing Sheets

(56) References Cited

U.S. PATENT DOCUMENTS

| | | | | |
|---|---|---|---|---|
| 5,054,066 A * | 10/1991 | Riek | | H04L 9/304 713/170 |
| 5,995,539 A * | 11/1999 | Miller | | H04L 25/03343 375/222 |
| 6,052,704 A * | 4/2000 | Wei | | G06F 7/724 708/492 |
| 6,111,952 A * | 8/2000 | Patarin | | H04L 9/3247 380/259 |
| 7,715,555 B2 | 5/2010 | Chen | | |
| 8,332,727 B2 * | 12/2012 | Kim | | G06F 11/1068 714/763 |
| 8,666,062 B2 * | 3/2014 | Lambert | | G06F 7/726 713/169 |
| 10,515,567 B2 * | 12/2019 | Lablans | | G06F 5/012 |
| 11,093,213 B1 * | 8/2021 | Lablans | | G06F 5/012 |
| 11,336,425 B1 * | 5/2022 | Lablans | | H04J 13/0029 |
| 11,811,920 B1 | 11/2023 | Zhao et al. | | |
| 12,056,549 B1 * | 8/2024 | Lablans | | H04L 9/3066 |
| 2002/0038420 A1 * | 3/2002 | Collins | | H04L 9/3249 713/156 |
| 2005/0094806 A1 * | 5/2005 | Jao | | G06F 7/725 380/30 |
| 2005/0267926 A1 * | 12/2005 | Al-Khoraidly | | G06F 7/724 708/492 |
| 2006/0149962 A1 * | 7/2006 | Fountain | | H04L 9/0897 713/151 |
| 2007/0011453 A1 * | 1/2007 | Tarkkala | | H04L 9/3247 713/168 |
| 2007/0152710 A1 * | 7/2007 | Lablans | | H03K 19/20 326/59 |
| 2008/0013716 A1 * | 1/2008 | Ding | | H04L 9/3093 380/30 |
| 2008/0054944 A1 * | 3/2008 | Kwon | | H03K 19/094 326/83 |
| 2008/0069345 A1 * | 3/2008 | Rubin | | H04L 9/0841 380/44 |
| 2008/0143561 A1 * | 6/2008 | Miyato | | H04L 9/0618 341/79 |
| 2008/0180987 A1 * | 7/2008 | Lablans | | G06F 7/49 365/189.08 |
| 2008/0244274 A1 * | 10/2008 | Lablans | | H04L 9/0662 708/492 |
| 2008/0273695 A1 * | 11/2008 | Al-Gahtani | | G06F 16/13 380/30 |
| 2009/0092250 A1 * | 4/2009 | Lablans | | G06F 7/582 380/255 |
| 2009/0220083 A1 * | 9/2009 | Schneider | | H04L 9/0662 380/42 |
| 2009/0310775 A1 * | 12/2009 | Gueron | | H04L 9/0643 380/28 |
| 2010/0086132 A1 * | 4/2010 | Tavernier | | H04L 9/304 380/255 |
| 2010/0115017 A1 * | 5/2010 | Yen | | G06F 7/724 708/492 |
| 2010/0208885 A1 * | 8/2010 | Murphy | | H04L 9/004 380/28 |
| 2010/0271100 A1 * | 10/2010 | Le | | G05F 1/46 327/269 |
| 2010/0299579 A1 * | 11/2010 | Lablans | | H03M 13/3983 714/781 |
| 2010/0306525 A1 * | 12/2010 | Ferguson | | H04L 63/06 713/151 |
| 2011/0016321 A1 * | 1/2011 | Sundaram | | H04L 67/34 713/171 |
| 2011/0033046 A1 * | 2/2011 | Nonaka | | H04L 9/3093 380/46 |
| 2011/0211691 A1 * | 9/2011 | Minematsu | | H04L 9/0618 380/46 |
| 2011/0213982 A1 * | 9/2011 | Brown | | H04L 9/3252 713/176 |
| 2011/0243320 A1 * | 10/2011 | Halevi | | H04L 9/0861 380/30 |
| 2012/0023336 A1 * | 1/2012 | Natarajan | | H04L 9/0841 713/179 |
| 2012/0027198 A1 * | 2/2012 | He | | H04L 9/06 380/28 |
| 2012/0027210 A1 * | 2/2012 | Takeuchi | | H04L 9/3263 380/255 |
| 2012/0121084 A1 * | 5/2012 | Tomlinson | | H04L 9/304 380/30 |
| 2017/0230509 A1 * | 8/2017 | Lablans | | H04J 13/0033 |
| 2021/0405518 A1 * | 12/2021 | Lablans | | H04N 13/243 |
| 2023/0125560 A1 * | 4/2023 | Lablans | | H03M 7/00 380/28 |
| 2024/0356727 A1 * | 10/2024 | Lablans | | H04L 9/32 |

OTHER PUBLICATIONS

Maolood et al. Modifying Advanced Encryption Standard (AES) Algorithm. Journal of Al-Rafidain University College For Sciences ( Print ISSN 1681-6870 Online ISSN 2790-2293 ) · Oct. 2021. DOI: 10.55562/jrucs.v4113.187.

Abikoye et al. Modified Advanced Encryption Standard Algorithm for Information Security. Symmetry 2019, 11, 1484; doi: 10.3390/sym11121484.

Topanto et al. Security improvement of aes algorithm using s-box modification based on strict avalanche criterion on image encryption. J Soft Comp. Exp., vol. 3, No. 1, Mar. 2022: 55-61DOI: 10.52465/joscex.v3i1.61.

Prayitno et al. A modified MixColumn-InversMixColumn in AES algorithm suitable for hardware implementation using FPGA device. Communications in Science and Technology 8(2) (2023) 198-207.

Luong et al. AES Security Improvement by Utilizing New Key-Dependent XOR Tables. IEEE Access, DOI 10.1109/ACCESS.2024.3387268.

Nitaj et al. A New Improved AES S-box With Enhanced Properties. 2020 downloaded from https://eprint.iacr.org/2020/1597.pdf DOI 10.1007/978-3-030-55304-3.

Sumathy et al. Enhanced AES Algorithm for Strong Encryption. International Journal of Advances in Engineering & Technology, Sep. 2012. vol. 4, Issue 2, pp. 547-553.

Moh'd et al. AES-512: 512-Bit Advanced Encryption Standard Algorithm Design and Evaluation. 2011, 7th International Conference on Information Assurance and Security (IAS).

Minier et al. Improving Integral Cryptanalysis against Rijndael with Large Blocks. Rapport de recherche—Oct. 2009, 11 pages, Unité de recherchel NRIA Rhône-Alpes.

Daemen et al. The Rijndael. Block Cipher, AES Proposal . Document version 2, Date: Mar. 9, 1999.

\* cited by examiner

```
function y=trans_cft(fun,invn)
% re-arrange table with 1 n-state inverter
% © 2024 Peter Lablans. All rights reserved.
len=length(invn);
gun=fun;
for i1=1:len
    for i2=1:len
        in1=invn(i1);
        in2=invn(i2);
        aa=fun(i1,i2);
        bb=invn(aa);
        gun(in1,in2)=bb;
    end
end
y=gun;
```

```
function y=mulbasen(n)
% base multiplication
y=ones(n,n);
for i=2:n
    for j=2:n
        cont=i+j-2;
        if cont>n
            cont=cont-n+1;
        end
        y(i,j)=cont;
    end
end
```

FIG. 5

```
>> mg8=mulbasen(8)
   mg8 =
        1   1   1   1   1   1   1   1
        1   2   3   4   5   6   7   8
        1   3   4   5   6   7   8   2
        1   4   5   6   7   8   2   3
        1   5   6   7   8   2   3   4
        1   6   7   8   2   3   4   5
        1   7   8   2   3   4   5   6
        1   8   2   3   4   5   6   7
```

FIG. 6

```
function y=mulbasindd(i,j,n)
    % base multiplication origin 0
    % © copyright 2024 Peter Lablans All rights reserved
    cont = i + j - 1; % Use VPI for the calculation
    if (i == 0) || (j == 0)
        y = vpi(0); % Use VPI for the result
    elseif cont > n-1
        cont = cont - n+1;
        y = cont;
    else
        y = cont;
    end
end
```

FIG. 7

```
function y=mulbassq(i,n,k)
    % base k times squaring origin 0
    % © copyright 2024 Peter Lablans All rights reserved
    is=vpi(i);
    js=vpi(i);
    for exp=1:k
        js=mulbasindd(js,js,n)
    end
    y=js;
```

FIG. 8

```
function y=shiftinter(x,k,m)
% shift by k (assume x is 256 bits)and k is positive
% create m parts and interleave form part m to part 1
% © copyright 2024 Peter Lablans All rights reserved
len=length(x);
aa=x(1:k);
bb=x(k+1:len);
newx=[bb aa];
nel=len/m;

partx=zeros(m,nel);
newy=zeros(1,len);

for i=1:m
    partx(i,:)=newx((i-1)*nel+1:(i-1)*nel+nel);
end
% interleave from i=m:-1:1
tel=0;
for j=1:nel
    for i=m:-1:1
        tel=tel+1;
        y(tel)=partx(i,j);
    end
end
% undo interleave
% pick j series m from y and put back in separate sequences
party=zeros(m,nel);

for j=1:nel
    partx(i,:)=newx(i*(m-1)+1:i*(m-1)+nel);
end
% interleave from i=m:-1:1
tel=0;
for j=1:nel
    for i=m:-1:1
        tel=tel+1;
        y(tel)=partx(i,j);
    end
end
```

FIG. 9

```
function y=transposfplus_nbin(x,invn,off)
% © copyright 2025 Peter Lablans All rights reserved
% transposition by invn with offset a binary set
len=length(x);
y=zeros(1,len);
x=x+1;% origin 1
off=off+1; % origin 1
x=xorall(x,off);
x=x-1; % origin 0
for i=1:len ind=invn(i);
    y(ind)=x(i);
end
```

FIG. 10

```
function y=transposbplus_nbin(x,invn,off)
% © copyright 2025 Peter Lablans All rights reserved
% transposition by rinvn with offset
len=length(x);
y=zeros(1,len);
x=x+1; % origin 1
off=off+1; % origin 1
rinvn=makerinvn(invn);
for i=1:len ind=invn(i);
    y(i)=x(ind);
end
y=xorall(y,off);
y=y-1; % return to origin 0
```

FIG. 11

|     |     |     |     |     |     |     |     |     |     |
|----:|----:|----:|----:|----:|----:|----:|----:|----:|----:|
|  68 |  87 | 214 | 205 | 182 | 135 | 345 | 131 |   1 |  86 |
| 167 | 218 | 131 | 202 | 124 | 212 |  68 | 134 | 171 | 113 |
|  76 |  43 | 137 |  19 | 198 |  89 | 120 | 129 | 339 | 196 |
|  36 | 246 |  86 | 241 | 173 | 191 |  64 | 113 | 346 |   0 |

FIG. 12

|     |     |     |     |     |     |     |     |     |     |
|----:|----:|----:|----:|----:|----:|----:|----:|----:|----:|
| 191 |  93 | 354 |  68 | 346 | 164 | 235 |  62 | 160 |  19 |
|  70 | 212 | 120 | 134 | 203 | 185 | 249 | 133 | 219 |  68 |
|  28 |   1 |  68 | 241 | 191 |  68 |  63 |  74 | 171 | 241 |
|  61 |  25 |  14 |  49 | 151 | 147 |  59 | 148 |  64 |  39 |

FIG. 13

|     |     |     |     |     |     |     |     |     |     |
|----:|----:|----:|----:|----:|----:|----:|----:|----:|----:|
| 246 | 187 | 184 |  28 |  72 | 241 | 191 | 122 | 206 |   4 |
| 101 | 233 | 190 |  64 | 253 | 122 | 177 |  95 | 225 | 192 |
| 206 |  69 |  71 | 251 |  56 | 210 | 206 | 218 | 243 |   3 |
| 219 | 305 | 250 | 347 |   7 |  40 | 192 | 137 |   1 |  83 |

FIG. 14

|     |     |     |     |     |     |     |     |     |     |
|----:|----:|----:|----:|----:|----:|----:|----:|----:|----:|
| 135 | 166 | 221 | 109 |  48 | 101 | 172 |   3 | 103 |   8 |
| 246 |  18 | 247 | 116 | 191 | 221 | 181 |  94 | 109 | 142 |
| 109 |  10 |  12 |  34 |  16 | 122 | 208 |  29 | 229 | 174 |
|   4 |  69 |  13 |  49 |  90 | 109 |  69 | 181 |  14 |  11 |

FIG. 15

|     |     |     |     |     |     |     |     |     |     |
|----:|----:|----:|----:|----:|----:|----:|----:|----:|----:|
| 202 | 211 | 110 | 158 | 133 |  98 | 199 | 212 |  24 | 180 |
|  85 | 122 | 206 |  67 | 183 |   8 |  57 |  94 | 183 | 177 |
| 183 | 252 | 246 | 247 | 199 | 189 |  40 | 162 | 225 | 246 |
| 123 | 112 |  33 | 211 | 230 | 214 |  36 |  37 | 193 | 171 |

```
function y=seq2invK(seqK,k)
    % create a k-state reversible inverter from k k-state sequence
    % Copyright Peter Lablans, 2025 All Rights Reserved
    % Initialize the occurrence count
    occurrences = zeros(1, k);
    % Count occurrences of each element
    for i = 1:k
        occurrences(seqK(i)) = occurrences(seqK(i)) + 1;
    end
    % Identify elements to keep in place, duplicates, and non-occurring elements
    unique_elements = [];
    duplicates = [];
    non_occurring = [];
    for i = 1:k
        if occurrences(i) == 0
            non_occurring = [non_occurring, i];
        elseif occurrences(i) == 1
            unique_elements = [unique_elements, i];
        elseif occurrences(i) > 1
            duplicates = [duplicates, i];
        end
    end
    % Create the modified sequence
    modified_seqK = seqK;
    duplicate_count = zeros(1, k);

% Replace duplicates with non-occurring elements
    for i = 1:k
        if duplicate_count(seqK(i)) > 0
            modified_seqK(i) = non_occurring(1);
            non_occurring(1) = [];
        else
            duplicate_count(seqK(i)) = duplicate_count(seqK(i)) + 1;
        end
    end
    y=modified_seqK;
```

COMPUTATIONAL FUNCTION TRANSFORMATION (CFT) IN COMPUTER IMPLEMENTED CRYPTOGRAPHY

CROSS-REFERENCE TO RELATED APPLICATIONS

This application is a continuation-in-part of and claims the benefit of U.S. patent application Ser. No. 18/741,663 filed on Jun. 12, 2024. This patent application claims the benefit of U.S. Provisional Application 63/747,282 filed on Jan. 20, 2025. This patent application claims the benefit of U.S. Provisional Application 63/726,453 filed on Nov. 29, 2024. This patent application claims the benefits of U.S. Provisional Application 63/573,331 filed on Apr. 2, 2024. All of the above cases and applications mentioned above are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Machine or computer based cryptography is nowadays essential for securely exchanging data over the Internet. But data, either in transit over networks and/or stored on what may be called In-Cloud servers at rest, is subject to almost continuous attacks and especially theft by malfeasants, including by state sponsored attackers, who may have almost unlimited means to attack and/or try to decrypt confidential data. While intrusion detection and prevention are important, certain detected Advanced Persistent Threats (APTs) seem unavoidable. In that context secure (unbreakable) encryption is important. Commonly, standard encryption like modes of the Advanced Encryption Standard (AES) and ChaCha20 as defined in Transport Layer Security 1.3 protocol are used.

The looming availability of effective quantum computing (QC) has elevated the risk of successful breaking or unauthorized decryption of stolen or intercepted encrypted data, technically known as ciphertext. In the USA measures are underway to counter QC attacks, in particular by the Post-Quantum (PQ) efforts by the National Institute of Standards and Technology (NIST). A competitive program has resulted in new PQ standards, now being published as Federal Information Processing Standards Publication (FIPS) or under development.

The NIST PQ program is currently focused on aspects of Public Key Infrastructure (PKI) as public key exchange is usually based on what is mathematically known as the Factoring and/or the Discrete Logarithm problems, which are sensitive to QC-attacks. The current believe is that standard encryption is less likely to be successfully attacked by quantum computers. There is currently no substantial efforts are undertaken to develop novel more secure encryption.

However, the indications for long term security (10-20 years) of standard encryption like AES and ChaCha20 are not very positive. Development of attacks on AES are ongoing. Combined with better/faster computational resources AES-128 is now considered not long term secure. Harvest Now/Decrypt Later (HNDL) attacks, reflect confidence of malfeasants to be able to decrypt in the future, either by keyword breaking or other means. Particularly disturbing are APT attacks with attack agents lurking inside servers undetected for years, collecting data that may make successful attacks much easier than expected. At the same time, the PQ methods now available are not really fit for encrypting large data files. Future, pure quantum encryption is under development, but not yet a solution for current ciphertext that is desired to remain secure for at least a decade, if not longer.

For at least the above reasons, methods and devices are required that improve security of current machine cryptography at sufficient levels that will successfully resist decryption and other attacks for at least 10 years, without substantially adversely affecting computer performance.

SUMMARY OF THE INVENTION

In accordance with an aspect of the present invention a computer-implemented method for generating cryptographic data is provided, comprising: transforming, by one or more processors, a sequence of n n-state data elements with n being an integer greater than 3 that is not an n-state reversible inverter into an n-state reversible inverter, the sequence of n n-state data elements including a first n-state element that occurs in at least two different positions in the sequence of n n-state data elements, the sequence of n n-state data elements not having a second n-state data element, and replacing the first n-state data element in one of the two different positions of the sequence of n n-state data elements with the second n-state element; transforming, by the one or more processors, one or more n-state data elements in a cryptographic operation based on the n-state reversible inverter, the cryptographic operation is selected from the group consisting of an encryption, a decryption, a hashing, a public key exchange and a digital signature generation; and transmitting, by the one or more processors, data generated based on the cryptographic operation on a physical channel to a second computing device.

In accordance with a further aspect of the present invention the computer-implemented method is provided, further comprising: generating by the processor, the sequence of n n-state elements from a sequence of k n-state data elements, with k being an integer smaller than n.

In accordance with yet a further aspect of the present invention the computer-implemented method is provided wherein the sequence of n n-state data elements is generated with a published Key Derivation Function (KDF) with the sequence of k n-state data elements as input.

In accordance with yet a further aspect of the present invention the computer-implemented method is provided, wherein the sequence of n n-state data elements is generated by a modified Advanced Encryption Standard Key Expansion method with a key of k n-state data elements as input.

In accordance with yet a further aspect of the present invention the computer-implemented method is provided, further comprising: generating by the processor a next n-state reversible inverter based on the n-state reversible inverter.

In accordance with yet a further aspect of the present invention the computer-implemented method is provided, wherein the sequence of k n-state data elements is a key determined by a Public Key Infrastructure (PKI) operation.

In accordance with yet a further aspect of the present invention the computer-implemented method is provided, wherein the sequence of k n-state elements is a sequence of 32 bytes generated by the Kyber method, as specified in the National Institute of Standards and Technology publication FIPS-203.

In accordance with yet a further aspect of the present invention the computer-implemented method is provided, further comprising: the cryptographic operation including a bitwise XORing of words of bits that is modified based on the n-state reversible inverter in accordance with a Finite Lab-Transform (FLT).

In accordance with yet a further aspect of the present invention the computer-implemented method is provided, wherein the cryptographic operation is selected from an encryption and/or a decryption defined by published standards pertaining to one of Advanced Encryption Standard Counter Mode (AES-CTR) and Advanced Encryption Standard Galois Counter Mode (AES-GCM) and an operation defined as a bitwise XORing of words of bits is replaced by an operation including an n-state carry function.

In accordance with yet a further aspect of the present invention the computer-implemented method is provided, wherein the cryptographic operation is selected from an encryption and/or decryption defined by published standards pertaining to one of AES-CTR and AES-GCM including processing modules Key Expansion( ), SubBytes( ), ShiftRows( ), MixCoumns( ), and AddRoundKey( ) and at least one module is modified based on the n-state reversible inverter.

In accordance with yet a further aspect of the present invention the computer-implemented method is provided wherein the n-state reversible inverter is applied in a Finite Lab-Transform, and/or a data element inversion and/or a reversible data shuffling.

In accordance with yet a further aspect of the present invention the computer-implemented method is provided wherein the cryptographic operation is selected from an encryption and/or decryption defined by a published standard pertaining to one of ChaCha20, XChaCha20 and Salsa20 including processing of words of 32-bits by XORing of words of 32-bits and addition of words of 32-bits modulo-$2^{\wedge}32$ and the processing is modified based on the n-state reversible inverter.

In accordance with yet a further aspect of the present invention the computer-implemented method is provided wherein the transforming of n-state data elements is implemented for a number of rounds smaller than a total number of rounds of the cryptographic operation.

In accordance with another aspect of the present invention a computing device is provided to generate cryptographic data, comprising: one or more memories enabled to store data and retrieve data, including instructions; one or more processors enabled to retrieve one or more instructions from the one or more memories which, when executed by at least one of the one or more processors, causes steps to be performed comprising to: transform a sequence of n n-state data elements with n being an integer greater than 4 that is not an n-state reversible inverter into an n-state reversible inverter, the sequence of n n-state data elements including a first n-state element that occurs in at least two different positions in the sequence of n n-state data elements, the sequence of n n-state data elements not having a second n-state data element, and replacing the first n-state data element in one of the two different positions of the sequence of n n-state data elements with the second n-state element; transform one or more n-state data elements in a cryptographic operation based on the n-state reversible inverter, the cryptographic operation is selected from the group consisting of an encryption, a decryption, a hashing, a public key exchange and a digital signature generation; and transmit data generated based on the cryptographic operation on a physical channel to a second computing device.

In accordance with yet another aspect of the present invention the computing device is provided, further comprising further program instructions that when executed, cause the computing device to: generate the sequence of n n-state elements from a sequence of k n-state data elements, with k being an integer smaller than n.

In accordance with yet another aspect of the present invention the computing device is provided, wherein the sequence of n n-state data elements is generated with a published Key Derivation Function (KDF) with the sequence of k n-state data elements as input.

In accordance with yet another aspect of the present invention the computing device is provided. wherein the sequence of n n-state data elements is generated by a modified Advanced Encryption Standard Key Expansion method with a key of k n-state data elements as input.

In accordance with yet another aspect of the present invention the computing device is provided, further comprising further program instructions that when executed, causes the computing device to generate by the processor a next n-state reversible inverter based on the n-state reversible inverter.

In accordance with yet another aspect of the present invention the computing device is provided, wherein the sequence of k n-state data elements is established by a Public Key Infrastructure (PKI) operation.

In accordance with yet another aspect of the present invention the computing device is provided, wherein the cryptographic operation includes a bitwise XORing of words of bits that is modified based on the n-state reversible inverter in accordance with a Finite Lab-Transform (FLT).

BRIEF DESCRIPTION OF DRAWINGS

FIGS. 3 and 4 are screenshots of computer implemented lookup tables in accordance with one of more aspects of the present invention;

FIG. 5 is a screenshot of a Matlab program in accordance with one or more aspects of the present invention;

FIG. 6 is a screenshot of a computer implemented lookup table in accordance with one of more aspects of the present invention;

FIGS. 7, 8, 9, 10 and 11 are screenshots of Matlab programs in accordance with one or more aspects of the present invention;

FIGS. 12, 13, 14, 15 and 16 are screenshots of Matlab generated data tables generated in accordance with one or more aspects of the present invention;

FIG. 17 is a screenshot of prototype data table generated by a computer;

FIGS. 18, 19, 20, 21, 22, 23 and 24 are screenshots of modified tables generated by a computer in accordance with one or more aspects of the present invention;

FIG. 25 is a screenshot of a Matlab program in accordance with one or more aspects of the present invention;

DETAILED DESCRIPTION OF THE INVENTION

Figures 1, 2:
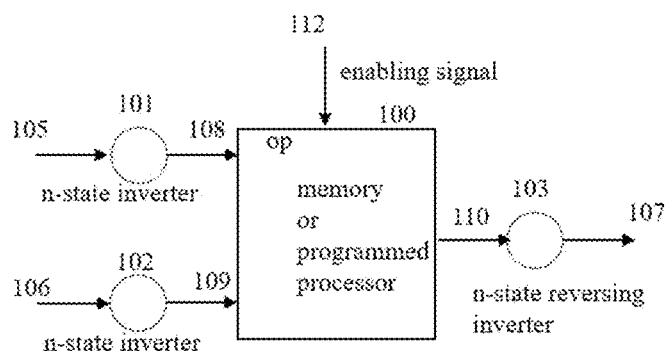
FIG. 1 is a diagram of a device that modifies a switching operation in accordance with various aspects of the present invention.
FIG. 2 is a screenshot of a Matlab program in accordance with one or more aspects of the present invention.

A computer is a switching machine. It has devices that switch through two or more states in accordance with a pre-established pattern. These patterns are commonly described as two-operand logic functions like XOR, AND, OR, NAND, or other binary logic functions. The logic function states are often described as numbers such as 0 and 1. However, there are no actual 0s and 1s inside a device. The 0s and 1s are symbolic descriptions by humans of the physical states of a switching machine.

In modern computer machinery, the binary states of switching devices are technically indicated by being either LOW or HIGH. What LOW and HIGH mean depends on the applied technology. In TTL switching devices, a LOW voltage may be between 0V and 0.8V, and a HIGH voltage may be between 2V and 5V. In standard CMOS devices, a LOW voltage may be between 0V and 1.5V, and a HIGH voltage may be between 3.5V and 5V. One may assign the logic value 0 to a LOW voltage and the logic value 1 to a HIGH voltage, but the reverse is also known.

Programmable computers and/or binary calculators are extremely complex switching devices with a significant number of basic switching components. This makes designing computer devices a complex undertaking. The work of Claude Shannon's master's thesis, titled "A Symbolic Analysis of Relay and Switching Circuits" and published in 1938, enabled a symbolic design of switching circuits such as the carry ripple adder. Despite its fame, computer design did not start using Boolean expressions until the 1950s. Even Howard Aiken, in his explanation in "Synthesis of Electronic Computing and Control Circuits" ("Synthesis") published in 1951 and available in the Annals of the Computation Laboratory of Harvard University Volume XXVII, used his own developed design notation and methodology, implied by multi-input or multi-grid electronic (tube) devices. Aiken explains on page 12, FIG. 1.2 of Synthesis, the relation and distinction between switching function, vacuum tube operator, symbolic circuit, and schematic circuit. Aiken points out the difficulty of using schematics of electronic circuits in designing a functional switching device and the benefits of using a more functional methodology, which can later be translated into a schematic realized in physical components. Aiken was aware of Shannon's work but found benefit in crafting his own system.

A member of the mentioned Staff of the Computation Laboratory in Synthesis is Gerrit Blaauw, who was a Ph.D. student of Aiken and was responsible for designing part of the Mark IV Harvard Machine. This is described in Blaauw's Thesis, "The Application of Selenium Rectifiers as Switching Devices in the Mark IV Calculator." Blaauw was responsible for the design of the Slow Storage and Sequence Units of Mark IV. He used the Aiken-developed functional design methodology combined with state diagrams or tables to ultimately realize the actual circuitry for the Mark IV.

Dr. Gerrit Blaauw was the inventor's professor in computer design. Gerrit Blaauw is also the author of Digital System Implementation. Herein, he explains that a computer design is described at a hierarchy of three levels: 1) the architecture, disclosing (to the system programmer) what the device does, 2) the implementation or logic, a functional (logic) description of how the function is realized by available functional components, and 3) the physical realization of real components that realize a functional requirement. One clearly distinguishes the experience that Blaauw had in designing the functional implementation in Mark IV based on the architecture provided by Aiken and realized with the usage of selenium rectifiers (or diodes).

Blaauw, in his book Digital System Implementation and later in his book Computer Architecture, uses executable APL instructions to create digital circuitry. The underlying truth of executable APL code is that it establishes a true physical realization. That is, the instructions, when executed, are not merely an abstract idea or a description; they establish a real-life physical circuit. While one may observe the design of this circuitry in terms of (functional) logic expressions, they represent an actual physical circuit.

Gerrit Blaauw is of course also one of 3 co-architects (Amdahl, Blaauw and Brooks) of the legendary IBM System/360. An architecture of which the effect still is felt and applied today.

The reason for the above piece of computer history is to emphasize that aspects of the invention disclosed herein, while for convenience described in terms of mathematical looking expressions and numerical states, are directed toward physical structures and require devices like configurable processors and memories and the like, and are not directed to an abstract idea. Furthermore, while in general programmable processors are built from active electronic devices, one could also replace them with addressable memory devices that store the required truth table. This may be applied in Read-Only-Memory (ROM) and in devices such as Programmable Logic Devices (PLDs) and Field Programmable Gate Arrays (FPGAs) as well as programmable processors.

One of ordinary skill in the art of computing devices knows that these devices, while storing a look-up table, are physical devices. The storing of a lookup table is actually a physical process, and no "numbers" are stored. In fact, physical states are created. One reason to point out these well-known facts here is that some people, generally not well-versed in computer design and/or realization, often believe that computers process numbers. But as explained above and well-known in the engineering literature, computers and processors do not do such a thing. The appearance of numbers occurs by apparatus that make it appear that numbers are inputted or displayed. For instance, when hitting a key 8 on a computer keyboard, a signal is generated that may be represented by a number 8. Similarly, when a computer display shows a number 8, it is the activation of light-emitting elements by a computer-generated signal that lights up as 8 on the display. Internally a computer mostly applies a binary L/H bitwise representation. These conversions of output signals to display numbers and key input to signals are well-known.

On an individual gate level in computers, one appears to work strictly with bits (or 0s and 1s), as some say. This is also not true. In general, computers process series or words of bits, which are treated as a single distinguishing entity. An example is the 8-bit word called a byte, which may be used to represent an ASCII character.

One may describe switching operations in terms of Boolean algebra or other mathematical terms. For instance, a bitwise XORing of words of 8 bits may be described as an addition over GF(256). But this is merely the description. In effect, the computer does not perform an addition over GF(256) as those concepts do not exist inside a computer. Still, for functional description, the use of addition over GF(256) is appropriate. But it goes with the understanding that such a description is merely a functional description of an operation. In effect, it has a logic implementation equivalent, in the sense of the teachings of Blaauw, which itself has a physical realization. This goes for all descriptions of operations following herein. This means that when an operation or function, even when described by mathematical terms, is programmed on a computer and generates an expected and/or valid result, then as taught by Blaauw, there is a physical realization, and we are directed to device functionality not to an abstract idea.

In that sense, a computer function, such as an addition modulo-n, for instance, is not merely a functional description. It also corresponds to a structured physical device that performs in accordance with logic operations that may be represented by the function addition modulo-n. The actual structure may, for instance, be a carry ripple adder structure in an Arithmetic Logic Unit (ALU) of a processor.

As Shannon and later Aiken already observed, it would be tiresome and very hard to understand if functionality was to be explained on a component schematic level. For the reason of simplicity and transparency, mathematical and functional terms are used with the understanding that a physical structure for doing the function exists or will be configured by instructions in the processor or device. For that reason, all functional and mathematical terms used herein are a (high level) description of a physical structure in a processor or switching device.

The inventor has observed that certain computer operations are now so well-known that they are considered standard and/or default. This is especially in relation to machine cryptography such as machine encryption, hashing, key exchange and signatures and others. For instance, combining two streams of bits is usually done by performing a bitwise XOR. When one combines by XORing words of k bits, one may describe the operation as an addition over GF(n=2^k). This is so common as to be applied without deep considerations.

Taking a step back, one may realize that there are several properties of this function that are of importance. The function is commutative, it has no bias toward any output when the input operands are uniformly distributed, the function is self-reversing or involution. There are additional important properties. So, instead of automatically selecting what may be called the standard addition over GF(2^k) one may apply a different function having the same properties. Such a different function has the benefits of having the same meta-properties of the original function. The dataflow does not change and the output of the cryptographic operation that applies the new function does not reveal any modifications in the output signals such as ciphertext in statistical properties. It will make successful attacks by brute force highly unlikely and for larger values of n in n-state completely infeasible.

It is very helpful when one can apply a deterministic modification to an n-state function and preferably and at least with 2-operand n-state function that preserves the meta-properties of the base function in its modified form. Thereto, the Finite Lab-Transform or FLT was invented and described for instance in US Pat. No. 11,336,425 to Peter Lablans issued on May 17, 2022 which is incorporated herein by reference. The FLT requires an n-state reversible inverter (invn), its reversing n-state inverter (rinvn), so that the two inverters in combination provide identity or: invn(rinvn(x))=x and rinv(invn(x))=x for all x being n-state elements, and a 2-operand n-state function. The FLT works as follows: call the input operands a and b and the 2-operand function is fun(a,b) with c=fun(a,b). The input operands are inverted with invn, then the inverted operands are applied in fun and the result is reversed inverted with rinvn. Or according to expressions: ai=invn(a); bi=invn(b); c=fun(ai, bi); and out is out=rinvn(c) or out=rinvn(fun(ai,bi)) or out=rinvn(fun(invn(a),invn(b))). One may also determine out=funflt(a,b). The function funflt is then a modified switching table of switching table fun. One may determine funflt LUT by running through all possible n-state input operands and applying a LUT for invn and rinvn. This has been done for instance for LUTs representing addition over GF(256) that are FLTed. Such a table requires a memory of 65 Kbyte. By itself not very small, but in the context of available memory in current computing devices negligible in size.

The FLT either as apparatus or as method implemented on an apparatus is illustrated in FIG. 1. A device 100 performs an n-state 2 operand operation, like an addition over GF(n), for instance implemented as a bitwise XOR of words of k bits so n=2^k. Device 100 has two inputs: 105 and 106 to receive the n-state operands, each operand is inverted by n-state inverter 101 and 102, respectively before entered upon inputs 108 and 109, respectively. For an FLT inverters 101 and 102 are identical. The device may optionally have a signal input 112, for a signal to enable or start execution of operation 100. The resulting n-state output signal is provided on 110. This n-state signal is then inverted by reversing inverter 103. If one calls 101 inverter 'invn' then 103 may be called 'rinvn" and invn(rinvn(x))=x indicating that the combination of invn and rinvn is identity. The resulting (and FLTed) signal is provided on output 107. The FLT is generally meta-properties preserving. That is, if 100 is characterized as an addition over GF(n) then the FLTed operation is also an addition over GF(n). Even though the numerical representation may be modified. One may use all elements as separate look-up tables. One may also represent the operation between inputs 105 and 106 and output 107, as its own lookup table as for instance an n by n n-state table. While the FLT is illustrated in a 2 operand example, the FLT may be applied to any p-dimensional operation or p-operand operation.

The FLT has been applied by the inventor in cryptographic programs in Matlab and Python and C as lookup tables and the use of LUTs actually makes the machine execution if not faster at least not slower than application of standard and unchanged functions. This has been done in applications such as SHA-256, AES-GCM, ChaCha20 as described on website Icip.in. The FLT requires both the n-state inverter and the corresponding n-state reversing inverter to be performed. One may do this FLT in real-time, using a rule based or an LUT set of inverters, or one may do this off-line and compute the condensed look-up switching table funflt and store it for later use. Again, for smaller values of n like n=256 up to perhaps n=4096 one can create LUTs. However, for much larger n like n being represented by 256 bits for instance, creating and storing an LUT is infeasible. In that case the FLT has to be applied with its components. That is inverting operands, then processing the inverted operands and reverse inverting the result.

The inverter and what is the reversing inverter may appear to be arbitrary in naming because of cause each n-state reversible inverter has a reversing inverter. For consistency and clarity, the inverters for the input operands are called the n-state reversible inverters and the inverter at the output is called the reversing inverter.

An n-state inverter may be stored in a look-up table. But it may also be programmed as a rule or an expression. For instance, one may have as inversion rule: invn(x)=xi=d*x+h modulo-n. The inversing inverter rule is then x=(xi-h)*d^-1 modulo-n, with x, xi, d and h all being n-state elements. The factor d^-1 may be computed using the Extended Euler Algorithm (EEA). One may make more complicated rules. For instance, one may divide the range of generated inversions in 2 equal parts and interleave the parts in a reversible way. This disturbs any linearity that existed.

For instance, one creates a shuffle index wherein the index of the shuffle vector is n/2+1:n of the original vector for each odd number from 1:n-1 in the shuffled vector and is the index ranging from 2 to n of the original vector for each even index number ranging from 2:n in the shuffled vector. This is of course a rule reversible shuffle. One may combine this with the invn(x)=xi=d*x+h modulo-n inversion. One can compute based on a numerical input the inverted value, which is a rule based invertible modification followed by an invertible interleave. Thus, one can unwind or unshuffled or reverse invert by rule the inversion while also breaking up linearity. The interleaving of 2 equal parts is a simple example. One can do also division into 4 or 8 or more parts and interleave. Or interleave with the 2 part rules several times. One may apply other, simple or more complex rules, such as reversing order of a part of elements. In combination, these relatively simple shuffles provide highly complex reversible inversions. Once programmed they can be executed very fast as the rules by themselves are very simple and not computationally intensive.

As a benefit, one may enter a number, which is the index of the original sequence and get as a result an "inverted" result that may be reversed. As a consequence, a rule based reversible n-state inverter has been created that allows inversion and reverse inversion of individual elements without need for creating a complete set of all inversions of a set of n n-state elements. This then allows the application of the Finite Lab-Transform on individual elements of a very large set of elements, for instance a set of elements determined by 256-bit or even 2048 bit or even greater.

One may desire to do an FLT of a large function like an addition over GF(2^32). The function itself is a bitwise XOR or words of 32-bits. The number 2^32 is about 4 billion. A 2^32 state inverter would require generating as well as storing 4*2^32 bytes or about 16 GBytes. And one would need to do the same for the reversing 2^32 state inverter. While not impossible, it would consume much of available storage space and RAM even in desktop computers. The operation of XORing words of 32 bits is very fast as this may happen by parallel processing.

The above provided method of individual element inversion and reverse inversion is very fast. Suppose one wants to do y=sn32bits(x1,x2) wherein x1 and x2 are 32-bit operands and sn32bits is the FLT of sc32bits which is the XORing of 32 bits words. In accordance with the above taught method one applies the inversion rule to modify a 32-bit word x1 into a 32-bit word x1i with rule based inverter inv32 bit(x1)=x1i with x1i also a 32-bits word. The inverter in this case is a set of instructions to modify a word or 32 bits and not a stored n-state look-up table. One applies the same to the 32-bit word x2 so that inv32 bit(x2)=x2i. One then applies the very fast XORing of the 32-bit words. Like out=bitxor(x1i,x2i). And next one applies instructions of the reversing inverter rinv32 bit(out)=outr with outr the resulting FLTed output 32-bit word. No storage of large lookup tables is required. Elements are inverted individually in accordance with the FLT. It specifically requires an n-state inverter (for instance as look-up table) or n-state inverter rule AND its reversing inverter (for instance as look-up table) or reversing inverter rule.

The inversion rule may be made more complicated, for instance by applying an p-state Feedback Shift Register (FSR) with k p-state shift register elements and n is a radix-p representation of k p-state elements. An inversion is the loading of the n-state element as k p-state elements in the FSR and running (shifting) the FSR for h cycles in one direction (for instance forward direction) and the reversing inverter is a corresponding FSR running in a reversing direction with as content the inverted content of the previous FSR and running the reversing FSR also for h cycles in the reverse direction ending up with the recovered original content in the shift register. This inversion by FSR is explained in U.S. patent application Ser. No. 18/741,663 to Lablans, filed on Jun. 12, 2024 which is incorporated herein by reference.

While it may be beneficial to store and use complete n by n n-state switching tables or look-up tables, the approach of using the FLT with individual inverters or inverter rules is also very fast and does not require large memory space.

Having explained the element-wise FLT and the benefits thereof, it is actually possible to create the complete n by n n-state modified switching table of a function like an addition over GF(n) or an addition modulo-n or a multiplication or an involution or any other transformation of a table that preserves the meta-properties of the table. One may call that part of a Computational Function Transformation or CFT.

The particular CFT wherein only a forward inverter is used (and absolutely no reversing inverter) works well. However it may work only on the entire n by n n-state table and often cannot be applied to individual n-state elements. One reason for that limitation is that it modifies the indices of the table. Thus one when converts n-state element fun (x1,x2) of a known function, it generates invn(fun(invn(x1), invn(x2)). Thus, while one starts with a function element on position (x1,x2) one ends up with a transformed element in position (invn(x1),invn(x2)). While useful in the long run, one wants to determine an output based on input (x1,x2). The above transformation says when one inputs (x1,x2) one gets and output elsewhere. Accordingly, one has to run through all possible inputs to find a guaranteed useful result for a table that applies to any input. Again, that is for a situation wherein only a forward or single n-state reversible inverter is used and not its corresponding reversing inverter.

Figures 3, 4:
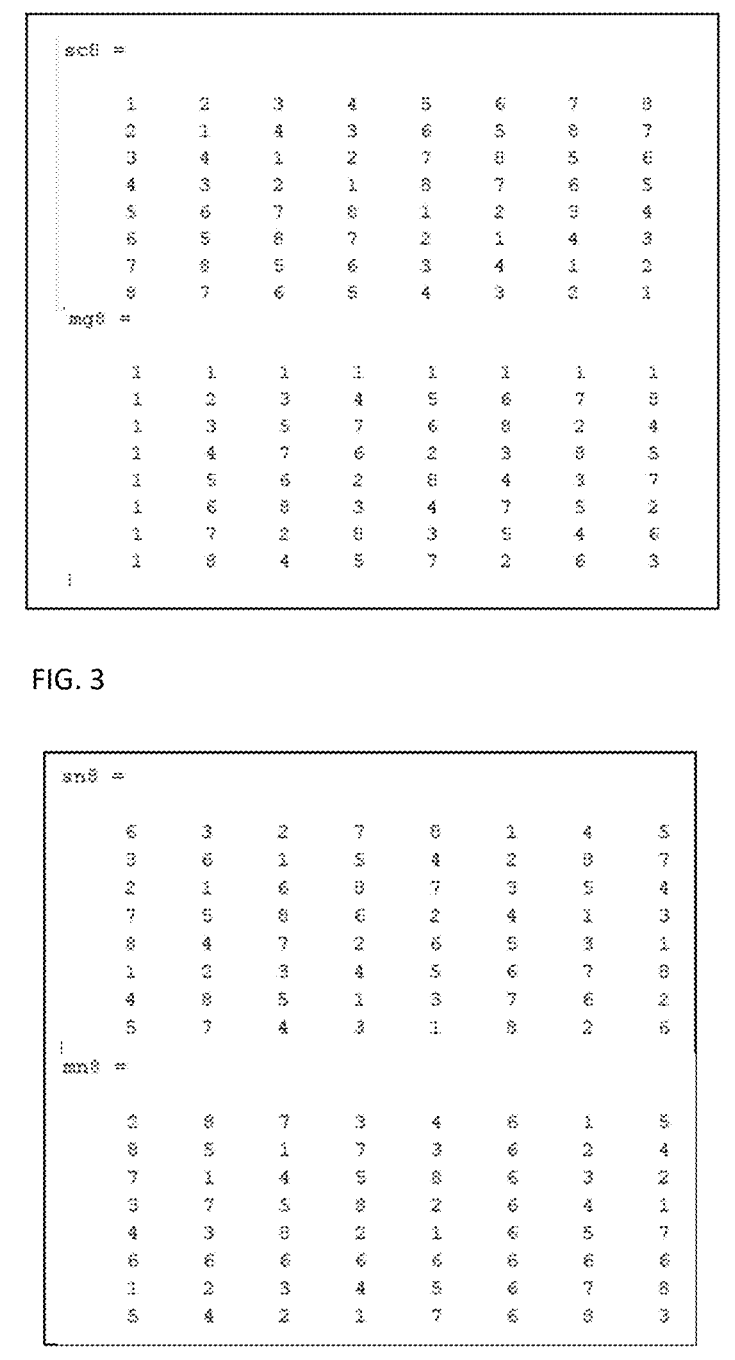

A screenshot of computer generated output of Matlab Code that performs that one-way transformation is shown in FIG. 2. As illustration: Assume the 8-state inverter: inv8=[8 3 6 7 5 1 2 4] in origin-1 as used in Matlab. The lookup tables for standard addition (sc8) and multiplication (mg8) over Finite Field GF(8) are shown in FIG. 3. The resulting FLTed 8-state tables of sn8 and mn8 are shown in a computer generated screenshot shown in FIG. 4. The meta-properties of sn8 and mn8 as "laws of composition" of a finite field GF(8) still hold and are preserved in the FLT.

Looking at trans_cft one sees that actually through in1=invn(i1) and in2=invn(i2) that gun(in1,in2)=aa. But if bb=invn(aa) then aa=rinvn(bb) per definition. And gun(in1, in2) is in fact fun(invn(i1),invn(i2)) and thus it says fun (invn(i1),invn(i2))=rinvn(bb). Or in words: the outcome of an operation wherein the input operands are converted by a reversible inverter has an outcome that is inverted with a corresponding reversing inverter, which is the definition of the FLT. And while it seems that no reversing inverter is used in trans-cft, in effect by assigning the outcome to inverted indices one applies the reversing inverter. One only does it per input pair and thus one cannot obtain a complete view of the FLT until all (or substantially all) input pairs have been processed. This is of course the overall problem with an n-state inverter that has no distinguishable inversion rule. Just knowing the numerical result of invn(x)=y says little about invn(y). It only determines that x=rinvn(y) and that invn(rinvn(x))=x. For instance, if we use 8-state inverters with identity id=[1 2 3 4 5 6 7 8]. we may use an 8-state inverter inv8=[2 a2 a3 a4 a5 a6 a7 a8]. We only know that rinv8(1) cannot be 1, because inv8(1)=2 and rinv8(inv8(1))=1 or rinv8(2)=1, so rinv8(1) cannot be 1 if the inverter is reversible. It is true that the possible occurrences of outcomes diminishes as more elements of the reversing inverter are determined, but a measure of uncertainty remains until the next to last element.

Thus, while it seems that trans_cft doesn't apply a reversing n-state inverter, it in fact does by assigning an inverted outcome to inverted sets of inputs, which requires a re-arrangement of the indices, which in effect is application of a reversing inverter.

Using k-State Inverters to n-State Operations

The ability to apply the FLT to transform individual n-state elements without the need to transform an entire n-state switching table, creates opportunities to confuse attackers of cryptographic messages.

This is based on using k-state reversible inverters that have a different cardinality than the operation it is applied to. For instance, one may have an addition over GF(256) but one may use a 257-state inverter, or a 258-state inverter or even a 1000-state inverter. However, some action has to be taken to keep the FLT operational. An important aspect is that the output of the k-state inverter must fit the cardinality of the n-state operation. That is, if the operation is n-state that accepts operands up to n−1 when coded in bits, it is unable to correctly process operands that are greater than n−1. For a 257-state inverter almost all inversions will fall in that category except the one case that generates the unacceptable input. Practically one (or a processor) should check if an input operand can be processed correctly, either as input or as inverted input. For most cryptographic operations that is impractical. But in certain cases it may be very useful.

In Public Key Exchange such as use of RSA and Diffie-Hellman ("DH") one uses unique parameters. That is in RSA unique (large) prime factors and in DH (large) exponents.

The modifications taught herein, either by FLT using both a reversible n-state inverter and corresponding reversing inverter and the modification using only the forward n-state inverter on modification of the operation element AND the related index either individually or as row/column index maintains the meta-properties or structure of an operation but modifies its numerical output. Because an inventor is allowed to be their own lexicographer, such a property modifying transformation is called a Computational Function Transformation ("CFT") herein.

The CFT as defined herein has several properties which will be explained and demonstrated.

1) the CFT is a transformation of an existing 2-operand n-state input operation (called the base operation, for instance 'fun') wherein descriptive properties (also called meta-properties) are preserved while a numerical representation of the CFT in a transformed n-state operation is different from the base n-state operation;
2) among the preserved meta-properties are at least one of: being associative, being an commutative involution, having a unity vector (1:n or 0:n−1), being a law of composition of a finite field, having a zero-element z for which fun(a,z)=a for all 'a', having a one-element 'e' for which fun(a,e)=a for all a; having a zero-element for which fun(a,z)=z for all a. A distinction is made between e and z. In some cases (such as in finite fields) there are two operations to be considered as being "laws of composition" of a finite field like scn (usually designated an addition) and mgn (usually designated a multiplication). In that case scn may have a zero element z for which sc4(a,z)=a for all a and has no element z for which sc4(a,z)=z for all a. However the function mgn (usually designated a multiplication) has a zero element z for which mgn(a,z)=z and a one element 'e' for which mgn(a,e)=a for all 'a'. In that case the zero element of scn may be called a neutral element. And the neutral element of scn is the zero element of mgn. Because commonly 0 is the neutral element of scn and the zero for mgn and 1 is the neutral element of mgn (in traditional cases) the terms zero element and one element are used;
3) using at least one n-state reversible inverter; and
4) being formed by one of the group consisting of: 1) FLT, 2) element-wise transformation of each element fun(i,j) of a lookup table representing the n-state operation with ONLY an n-state reversible inverter (funt(i,j)=invn(fun(i,j))) AND inversion of the corresponding indices {funtrans(r,c)=funt(i,j)} or funtrans(invn(i),invn(j))=invn(fun(i,j)) 3) row and column wise transformation of fun by ONLY n-state reversible inverter invn. Create funt(i,j) as funt(i,j)=invn(fun(i,j)). Then do either funtemp1(invn(r,:))=funt(r,:) for all rows; and funtemp2(:,invn(c))=funtemp1(:,c) or do funtemp1(invn(:,c))=funt(:,c) for all columns and funtemp2(invn(r),:)=funtemp1(r,:). The resulting table funtemp2 represents the CFT transformed function.

The above create implemented functions either in active components or with stored look-up tables that are currently unknown and/or that differ from well-known and much applied devices.

Let's give some examples. For convenience sake, 4-state examples are provided. These examples allow one of ordinary skill to perform the transformation manually with paper and pencil. Though a drawing or notation of a table on paper if of course NOT an implementation of an n-state switching function on a processor or as a switching device and should be considered as an illustration not as a limitation.

1) base=addition over GF(4) formed by bitwise XOR of words of 2 bits

| sc4 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

This function illustrated by its look-up table is 1) commutative 2) is associative 3) is a commutative involution; 4) has a unity vector: column and row for index 0 5) has a zero-element z=0 as sc(a,0)=a for every input a. (for origin-0 representation)

FLT: Applying inv4=[3 0 1 2] which has rinv4=[1 2 3 0](working in origin-0) in an FLT of sc4 will generate sn4:

| sn4 | 0 | 1 | 2 | 3 |
|---|---|---|---|---|
| 0 | 1 | 0 | 3 | 2 |
| 1 | 0 | 1 | 2 | 3 |
| 2 | 3 | 2 | 1 | 0 |
| 3 | 2 | 3 | 0 | 1 |

The function sn4 is 1) commutative 2) associative 3) is a commutative involution; 4) has a unity vector: column and row for index 1; 5) has a zero-element z=1 as sn4(a,1)=a for every input a. (for origin-0 representation)

Applying only inv4 in forward modification by inverting elements and indices provides sp4:

| sp4 | 0 | 1 | 2 | 3 |
|---|---|---|---|---|
| 0 | 3 | 2 | 1 | 0 |
| 1 | 2 | 3 | 0 | 1 |
| 2 | 1 | 0 | 3 | 2 |
| 3 | 0 | 1 | 2 | 3 |

The function sp4 is 1) commutative 2) associative 3) is a commutative involution; 4) has a unity vector: column and row for index 3; 5) has a zero-element z=3 as sp4(a,3)=a for every input a. (for origin-0 representation).

Performing the row/column based transformation provides the same result as the generation by forward modification by inverting elements and indices provides using only inv4.

In a next example a commutative involution NOT based on bitwise XOR will be transformed. This is a commutative involution.

| sv4 | 0 | 1 | 2 | 3 |
|---|---|---|---|---|
| 0 | 0 | 1 | 3 | 2 |
| 1 | 1 | 0 | 2 | 3 |
| 2 | 3 | 2 | 1 | 0 |
| 3 | 2 | 3 | 0 | 1 |

This function is an involution or self-reversing. c=sv4(a,b) and a=sv4(c,b) and a=sv4(b,c) etc. The function sv4 is not associative. The function sv4 does NOT have a column or row with identity. And sv4 does not have a common zero-element.

Performing an FLT on sv4 with earlier inv will generate:

| sv4f | 0 | 1 | 2 | 3 |
|---|---|---|---|---|
| 0 | 2 | 3 | 0 | 1 |
| 1 | 3 | 1 | 2 | 0 |
| 2 | 0 | 2 | 1 | 3 |
| 3 | 1 | 0 | 3 | 2 |

The function sv4f is a commutative involution. The function sv4f is not associative. The function sv4f does NOT have a column or row with identity. And sv4f does not have a common zero-element. Using inv4 in forward modification by inverting elements and indices provides sv4p:

| sv4p | 0 | 1 | 2 | 3 |
|---|---|---|---|---|
| 0 | 3 | 1 | 2 | 0 |
| 1 | 1 | 0 | 3 | 2 |
| 2 | 2 | 3 | 0 | 1 |
| 3 | 0 | 2 | 1 | 3 |

The function sv4p is a commutative involution. The function sv4p is not associative. The function sv4p does NOT have a column or row with identity. And sv4p does not have a common zero-element. Performing the row/column based transformation provides the same result as the generation by forward modification by inverting elements and indices provides using only inv4.

As yet another example the addition modulo-n and its transformations are provided, using for illustrative and comparative purposes the same inverter inv4. For illustrative purpose the table add4 is provided for addition modulo-4

The function add4 is 1) commutative 2) associative 3) has a unity vector: column and row for index 0; 4) has a zero-element z=0 as add4(a,0)=a for every input a. (for origin-0 representation)

| add4 | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

Using the FLT with the earlier inv4 inverter generates add4f:

| add4f | 0 | 1 | 2 | 3 |
|---|---|---|---|---|
| 0 | 3 | 0 | 1 | 2 |
| 1 | 0 | 1 | 2 | 3 |
| 2 | 1 | 2 | 3 | 0 |
| 3 | 2 | 3 | 0 | 1 |

The function add4f is 1) commutative 2) associative 3) has a unity vector: column and row for index 2; 4) has a zero-element z=1 as add4f(a,1)=a for every input a. (for origin-0 representation).

Using inv4 in forward modification of add4 by inverting elements and indices provides add4p:

| add4p | 0 | 1 | 2 | 3 |
|---|---|---|---|---|
| 0 | 1 | 2 | 3 | 0 |
| 1 | 2 | 3 | 0 | 1 |
| 2 | 3 | 0 | 1 | 2 |
| 3 | 0 | 1 | 2 | 3 |

The function add4p is 1) commutative 2) associative 3) has a unity vector: column and row for index 2; 4) has a zero-element z=3 as add4p(a,3)=a for every input a. (for origin-0 representation). Performing the row/column based transformation provides the same result as the generation by forward modification by inverting elements and indices provides using only inv4.

Next a function mg4 is provided which is the representative table for a multiplication over GF(4). Together with sc4 it forms the laws of composition for GF(4)

| mg4 | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

The function mg4 is 1) commutative 2) associative 3) has a unity vector: column and row for index 1; 4) has a zero-element z=0 as mg4(a,0)=0 for every input a. 5) has a one element e=1 for which mg4(a,e)=a for every input 'a' (for origin-0 representation).

Using again inv4 and applying it to an FLT of mg4 provides mn4:

| mn4 | 0 | 1 | 2 | 3 |
| --- | --- | --- | --- | --- |
| 0 | 3 | 1 | 0 | 2 |
| 1 | 1 | 1 | 1 | 1 |
| 2 | 0 | 1 | 2 | 3 |
| 3 | 2 | 1 | 3 | 0 |

The function mn4 is 1) commutative 2) associative 3) has a unity vector: column and row for index 2; 4) has a zero-element z=1 as mg4(a,1)=1 for every input a. 5) has a one element e=2 for which mg4(a,2)=a for every input 'a' (for origin-0 representation).

Using inv4 in forward modification of mg4 by inverting elements and indices provides mp4:

| mp4 | 0 | 1 | 2 | 3 |
| --- | --- | --- | --- | --- |
| 0 | 0 | 1 | 2 | 3 |
| 1 | 1 | 2 | 0 | 3 |
| 2 | 2 | 0 | 1 | 3 |
| 3 | 3 | 3 | 3 | 3 |

The function mp4 is 1) commutative 2) associative 3) has a unity vector: column and row for index 2; 4) has a zero-element z=3 as mp4(a,3)=3 for every input a. 5) has a one element e=0 for which mp4(a,0)=a for every input 'a' (for origin-0 representation).

Performing the row/column based transformation provides the same result as the generation by forward modification by inverting elements and indices provides using only inv4.

There are some trivial modifications that one preferably should avoid using in machine cryptography because they are easy to check. One such modification is using a row of an addition-like n-state table as an n-state inverter. This is shuffling the rows of a table and is easy to check.

In the addition-type functions one has the benefit of generating simple base functions, like bitwise XOR of words of bits, or using a modulo-n addition, which in general can easily be generated both as function rule and as a table. For instance, Matlab has the VPI or Variable Precision Integer tool that allows accurate processing of integers of large and almost arbitrary size. Other machine or programming languages have a similar Big Integer facility.

For instance, in Matlab one can do:
num1=vpi('12345678901234567890123456789
   01234567890123456789O');
num2=vpi('98765432109876543210987654321098
   765432109876543210');
% Step 3: Perform the addition and modulo operation
modulus=vpi(2)^256;
result=mod(num2*num2, modulus)
% as an example of big integer operation This is helpful in certain large integer cryptographic operations with FLT such as RSA and Diffie Hellman where one may want to use 256 bit integers or even larger. Currently, both recommend 2048 bit numbers. In that sense operations like multiplications of GF(n=2^k) with k large like 256 seem to be at a disadvantage. However, there is a simple expression for any n-state multiplication, wherein the multiplication is the logarithmic representation. A screenshot of a Matlab program to generate such multiplication is shown in FIG. 5. This is a program in origin-1 and FIG. 6 is a screenshot of table generated for an 8-state multiplication over GF(8) in origin-1.

The function is associative, it has a zero and a one element and a unity vector. (taking into account the origin-1 representation). This base representation is useful in for instance Diffie-Hellman key exchange using multiplication over GF(2^k).

A screenshot of a program for individual multiplication computation in Matlab using the consecutive values as above in origin-0 is shown in FIG. 7.

The element 2 is a generator of a finite field GF(2 k) with the above multiplication as a law of composition. One may pre-compute large powers and apply the squaring approach, by splitting the exponent into its binary terms. The screenshot in FIG. 8 shows a Matlab program that does the consecutive squaring using a base or generator g. The Matlab programs use the VPI (Variable Precision Integer) package to enable very large integers.

One may use the FLT for modifying the Diffie Hellman (DH) process. This process includes a) determining a large n, commonly a large prime number of 2048 bits or more in classical DH; b) determine a primitive element or a generator g that generates all elements of the set as an exponentiation of g; d) of 2 parties setting up a common key words party 1 selects secret exponent k1<n and generates t1=g^k1 mod-n and party 2 selects secret exponent k2<n and generates t2=g^k2 mod-n and party 1 transmits t1 to party 2 and party 2 transmits t2 to party 1; e) party 1 in possession of k1 computes key1=t2^k1 mod-n and party 2 in possession of k2 computes key2=t1^k2 mod-n and key1=key2=g^(k1*k2).

For classical DH it is recommended to use n being at least 2048 bits. One may actually use a much smaller size by applying secret n-state inverters. For instance, one may use n is exactly 256 bits or n=11579208923 73161954235709850086879078532699846656405640 39457584007913 129639936.

A potential problem may be that the inversion of g with an n-state inverter in that case may NOT be a generator of the set of numbers which may shorten the outcome of the exponentiations. The simplest way to address that is use n being exactly 521 bits. In that case n−1 is a Mersenne prime and all elements of the set are generators. Unfortunately that is not the case for n being exactly 256 bits. The structure of the multiplication of consecutive numbers allows for a simple determination of which elements are generators and which are not.

The determination is the process to compute if n−1 and g−1 are coprime. That is: compute the GCD. If the GCD=1 then g is a generator, if not then g is not a generator. Now the n-state inverter plays a role twice. First in inverting an input operand, which in this case is g and secondly the reverse inversion after determining g^k mod-n. The second part hides the true result of g^k mod-n. What the outcome is, is unimportant as it will be reversed again at a receiving side. But it is important for the input operand. Now there are always 2 generators in the set g=2 and g=n−1. But other may be possible.

For g=2 and/or g=n−1 one can ensure correct inversion, in the sense that any g is inverted either into 2 or n−1. The outcome of the exponentiation is reverse inverted and may have any outcome. Another way would be to construct an n-state inverter that inverts 2 or n−1 into a valid generator. One may then determine and store a secret set of n-state inverters that are known preferably only to the two parties.

In the above example n is given as a VPI operand. Then generate a rand number, for instance g=vpi ('98765432109876543211'). One then checks gcd(n−1, g−1)=255 in Matlab. Thus this g is not a generator. Then do gcd(n−1,g−2)=1. Thus g−1 or g=98765432109876543210 is a generator. One can create the inverter ind=vv*g+ss wherein g=2 for instance select vv=g/5 which leaves ss=3*vv and thus ind=19753086421975308642*g+59259259265925925926. The reversing inverter of ind=aa*x+ss mod-n is x=aa−1*(ind−ss). Fortunately, in the logarithmic represented (or "consecutive") table, determination of the multiplicative inverse is very simple. For any element g in set of n elements the multiplicative inverse is gi=n+1−g.

So in: ind=19753086421975308642*g+59259259265925925926, aa=19753086421975308642. Using aai=n256+1−aa (n256 is $2^{256}$) and applying VPI one gets:
aai=115792089237316195423570985008687907853269984665640564039437830921491154331295. One may test that prod=mulbasindd(aa,aai,n256) one gets prod=1. And thus the reversing inverter in this example is xi=aa−1*(ind−ss) mod-n, of course keeping in mind that '*' is the earlier defined logarithmic/consecutive multiplication and NOT the standard multiplication modulo−n.

Because not all elements of the set determined by n=$2^{256}$ are generators of the set, one has to construct an inverter that inverts a generator like g=2 into another generator. Based on the preferred outcome one may create any expression ind=aa*x+ss that creates 'ind' as a valid generator. The outcome of the reversing generator has to be inverted again in follow-up computations of DH. This latter fact for DH has consequences for using separate inversions instead of a prescribed FLT.

It was explained that the multiplication or "*" operation in this case was different from a modulo−n multiplication. We may do the same to the addition "+" in ind=aa*x+ss. The "+" herein is the modulo−n addition which is of course reversed by the modulo−n subtraction. One may replace the '+' with a bitwise XOR. This will generate a different outcome. The reason to use this replacement is not that either '+' or XOR are difficult. The reason is that the computer operation described by addition modulo−n and bitwise XOR are all pre-implemented in computers and are rule based. So one may perform them on large and very large numbers as no pre-stored tables are required. In that sense, one should consider the rule-based n-state inverter being represented by ind=(aa⊗x)⊕ss wherein ⊗ has the meta-properties of a multiplication and ⊕ has the meta-properties of an addition. Still referring to a DH-type operation the expression ind=(aa⊗x)⊕ss is a reversible n-state inverter rule. The rule has been set up so 'ind' is a generator that is to be processed as an exponentiation: tt=ind^k1 (or tt=ind⊗ind⊗ind . . . ⊗ind; applied k1−1 times). Assuming that the other DH party has access to the same (secret) inversion rule, one applies ttpublic=aa⊗(tt−ss). Or if the bitwise XOR is used ttpublic=aai⊗(tt⊕ss) with aai⊗aa=1.

The party receiving ttpublic inverse it with the inversion rule or ttpublici=(aa⊗ttpublic)+ss. Or: ttpublici=(aa⊗aai⊗(tt−ss))+ss=tt−ss+ss=tt. And tt is of course some generator g to the power k1.

Here are some examples again. n=$2^{256}$ and using gcd (n−1,g−2)=1 test after generating a random large number smaller than $2^{256}$ one may find: ginv=70027753724275266679310561569516220446877295681469768232560255718249600 6035 as being a generator. That means that a public generator like gpublic=2 has to be inverted to ginv. Use:
aa=27753724275266679310561569516220446877295681469768232560255718249600 6035 then if ginv=aa0gpublic+ss, which provides ss=mod(ginv-aa?gpublic, n=$2^{256}$) or ss=6999999999999999999999999999999999999999999999999999-99999999999999999999 9999999.

Let's say k1=65537 or k1=$2^{16}$+1. This means we have to compute ginv^65537=(ginv^($2^{16}$))⊗ginv^1. In other words, we need to square ginv 16 times using ? and then multiply one more time with ⊗ginv. Using mulbassq(i,n,k) and mulbasindd(i,j,n) this will create ttk1=ginv^k1 or ttk1=40421620301068135885652672373433884375059343171178646947811522935641410 035999. The public key is achieved by the reverse inversion ttpublic=aai⊗(ttk1−ss). One computes aai with aai=n256+1−aa (n256 is $2^{256}$) one gets aai=115791811700073442756777879329927456488012117088258663571319814507306 33633902. One may check with mulbasindd(aai,aa,n)=1 that aai is the inverse. Applying ttpublic=aai⊗(ttk1−ss) provides ttk1public=39721342763825383218859566757738722170590570214363949265485920378458914 029966.

A second DH party receives ttk1public and applies ttpublicinv=aa⊗ttk1public+ss and recovers the (secret) ttk1 or ginv^ k1. The second party applies k2=($2^{64}$)+7 to compute ginv^(($2^{64}$)+2) using the same n-state inverter. That means squaring 64 times of ttk1 (recovered from ttpublic), times multiplied 7 with ttk1 or ttk1k2=ttk1^($2^{64}$)+7=(ttk1 ^($2^{64}$))⊗ttk1⊗ttk1^ttk1^ttk1^ttk1^ttk1^ttk1. This will get as result ttk1k2=43903042485525341941772092410267798482100526028406291103456876550683016574220. Then doing the reversing inverter will create common key2=: 432027649482825892749789867945726362776317530715915934211312739935005 20 568187. And of course key1=key2.

After proper setup, a Matlab program performs the above very fast, at least within seconds and measured within 5 seconds. One could demonstrate the approach of the above aspects of the present invention with so called toy examples or toy parameters. Like n=32. The inventor deliberately used n=$2^{256}$ to demonstrate the required aspect of applying a computing or processor device to perform generating a common key. It should be evident that no person could do the above computations in real-time to compete with a computer. That is, the above approach is specifically and expressly to be performed on a computing device with a limited time of preferably less than 30 seconds, more preferably less than 15 seconds and most preferably less than 5 seconds. No person could do that in their mind even with help of paper and pencil. The time constraint is a technical one, as the common keyword is to be used in data exchange of encrypted data. Thus a common key is required for proper encryption and later decryption of data and/or a message. And in order to facilitate rapid and reliable data exchange, computer users generally want to avoid waiting times for computer processes to be completed. It is known that computer users will move to or use other services that do not have these waiting times.

The use of n=$2^{256}$ or using data of a size of 256 bits is also a reasonable size. The idea is that the security of the parameters should be greater than brute force guessing of a keyword. In general, it is accepted that 128 bit sizes is about the minimum size, but borderline. Preferably thus one selects for the above approach parameters greater than 128 bits in size and preferably greater than 150 bits and most preferably 256 bits or greater.

The above security is created by the unpredictability of both the inverters as well as exponents k1 and k2. Neither can be derived from public key data that is transmitted and it is impossible to construct the common key from public data without knowledge of the inverters, which should be kept secret.

One may also to the benefit of security apply the fact that for n=2^256 not all elements of the set of elements are generators. By storing one or more kept secret n-state inverters one may select an n-state inverter therefrom. Either by using them in order or giving them a number or a code, or using them by date or time or other agreed upon rule. The device starting the exchange may set a valid generator like g=2 or any other generator for the case n=2^256. Using the selected n-state inverter may invert the selected generator to 'ginv' which may or may not be a valid generator for the set. When the n-state inverter is ginv=aa⊗g+ss, and ginv is NOT a generator, one may add a factor 'fac' to ss so that ginv=aa⊗g+ss+fac is a generator. In that case the new inverter becomes ind=aa⊗x+(ss+fac) and the new reversing inverter is: x=aai⊗(ind−ss−fac). One may set a rule to change 'ss' by subtracting or adding 'fac'. One may also agree on finding not the first but second or even kth generator element counted from 'ginv.' Similarly, if 'ginv' turns out to be a generator, one may still agree on modifying to the kth next generator by adding or subtracting a factor 'fac' from 'ss'.

One is working with the need of rule-based operations as n=2^256 is too large to have stored lookup tables. One thus has to rely on internal processor capabilities or on rules or instruction based operations. Modulo-n additions are generally internally enabled operations in a processor.

In accordance with an aspect of the present invention, one may FLT the '+' operation with its own rule based n-state inversion ind_plus=aa_plus*x+ss_plus and its corresponding reversing inverter. One may also replace '+' with the bitwise XOR of the two operands like: ginv=aa⊗g ⊕ss. This makes the reversing inverter simpler as x=aai ⊗(ginv ⊕ss).

A very effective "inversion" is a change in the representation of the common key, as this has no directly detectable relation to any public data. One may agree for device 1 and device 2 to use a common modification of a 256 bit word. So the common key is represented as 256 bits with leading zeros if need be. Both devices already have achieved a common key even before reverse inversion. One may do the additional inversion before or after or even instead of the reverse inversion. Such an inversion may be one way, but may also be reversible, even though there is no need for reversing it. As an illustrative example, one may use: take the 256 bit sequence and shift it k bits in a circular way. For instance, take k bits from the left side of the sequence and place them on the right side of the sequence. Then cut the shifted sequence in m equal parts. And then, for instance starting from the back forward, form a new sequence by taking a bit from each part and place them in consecutive positions in the new sequence, moving through the parts until all bits have been placed. A Matlab program that performs such an 'inversion' is shown as a screenshot in FIG. 9.

And to demonstrate how this shift/interleave works out for shifting by 17 bits and parsing into 8 equal parts works out the instruction shiftinter(xc,17,8) has been performed on a sequence [1 2 3 . . . 255 256] showing how the bits will be dispersed. The result is:

yc=[74 67 60 53 46 39 32 25 75 68 61 54 47 40 33 26 76 69 62 55 48 41 34 27 77 706356494235287871645750433629797265585144- 3730807366595245 383181746760534639328275 68615447403383766962 55484134847770 635649423585787164575043 3686797265585144378780736659524538 888174676053463989827568615447409083 766962 5548419184777063 5649429285787164575043938679726558514494 878073665952459588 81 74676053469689827568615447979083766962 5548989184777063 56499992857871645750 1009386797265585110194878073665952 102 9588817467605310396898275686154 10497908376696255105989184 77 70 63 56]. Herein the numbers provide the position of the bits in their original sequence.

One requirement is that both or all machines computing a common key or a common keystream or a common hash apply the same inversion. However, the above and related inversion of bit positions is reversible by unspooling so to speak the inversion in reverse order. This is specifically mentioned because the bit inversion is performed as a rule-based inversion.

However, the words of bits are limited in size. Having a length of 256 elements, one can easily create, store and reverse 256-state inverters. Even words of several 1000 bits can easily be inverted and reverse inverted that way. Not being limited by a rule significantly increases the number of permutations one may apply to a word or sequence of bits.

In the above case, using the rule based transposition one gets as transposed output converted back to VPI format: seq1=955398208677088334723922654780266068- 77413362663201082839755378809985073 138859, created from key1=432027649482825892749789867945726362776 31753071591593421131273993500520 568187.

One may change the rules in any way that is a bijection. In general reversal may not be needed and one may apply a non-reversible rule. However as disclosed above, one may also create a random (not necessarily rule based) n-state inversion to be used as a look-up table based transposition. Matlab generates a reversible n-state inverter with invn=randperm(n). Matlab (and other programming languages) by itself seems not to pose a limitation on the size of n. The limitation is the allocation of memory. The inventor successfully invoked randperm(1000000) in Matlab and stored it as a lookup table without problems.

The inverter 'invn' is reversed by reversing inverter 'rinvn' which may be obtained for instance by the rule rinvn(invn(x))=x. Of course, rinvn and invn may be switched in meaning, so rinvn is the inverter and invn is the reversing inverter. One may apply this type of inversion on key generation, such as Diffie Hellman, classical and elliptic curve based, on RSA and ElGamal as well as others including post quantum PKI.

N-State Element Stream Inversion

In accordance with various aspects of the present invention a stream of binary and n-state elements (n>2) containing 3 or more bits or n-state elements, respectively, is modified in a reversible way. Preferably, the stream has at least 31 bits or n-state elements equivalent to 31 bits. Disclosed are two types of modifications or transformations. A first modification is a reversible shuffling The inventor disclosed n-state based transposition in U.S. Pat. No. 8,180,187 to Peter Lablans, issued on May 12, 2012 which is incorporated herein by reference (the '187' patent). The 817 patent applies a pseudo-random sequence as a shuffling or transposition rule.

Another transformation is the n-state inversion. That is, one applies an n-state reversible inverter (if one wants a reversible transformation) to n-state symbols in a stream of n-state elements.

The shuffling has as a result a shuffled stream which has the same base-elements, placed in a different order. The n-state inversion with an n-state inverter may change the direct make-up of a stream. However, the long term transformation, assuming ultimately a resulting random ciphertext or hash will not show any significant change in the distribution of elements due to the transformation. One reason for that is that the random signature of ciphertext/hash is determined by rounds of computational operations, which will not be changed.

An n-state inversion may be done on the n-state symbols using an n-state reversible inverter. For instance a 4-state inverter may be expressed as inv4=[2 3 4 1]. Inversion of x takes place as inv4(x) or the value of x serves as an index of an array and returns the value of inv4 at that index. Similarly, one may construct a reversing 4-state inverter rinv4 that undoes inv4 and would be rinv4=[4 1 2 3], with condition inv4(rinv4(x))=x. For convenience this is expressed herein in origin-1. Origin-0 is also contemplated as well as other representations.

This, as stated above, requires either a lookup table or a reversible rule. Yet another inversion is a reversible bit shuffling of the bits in a word of bits that represent an n-state symbol with $n=2^k$.

For instance a 16-state element may be represented by a word of 4 bits, which may be represented as word=[1 2 3 4] wherein 1, 2, 3 and 4 represent the position of a bit. Each position may be occupied by a bit being 0 or 1. For instance bin41=[1 0 0 0] or bin42=[1 10 0] etc. The representation inv4=2 3 4 1] provides a scheme for reversibly shuffling the bits and using inv4 rule create shuffled words bin41s=[0 0 0 1] and bin42s=[10 0 1]. One may recover the unshuffled words by reversing rule rinv4=[4 1 2 3]: bin41u=[1 0 0 0] and bin42u=[11 0 0].

Of course, this type of shuffle is smaller than the number of original n-state reversible inverters which has factorial of n (n!) variations including identity. The bit shuffle of $n=2^k$ has factorial of k (k!) variations. Thus, for n=16 there are 16! or about $2*10^{13}$ variations but only 4! or 24 shuffles. Furthermore all 0 and all 1 words are always shuffled onto themselves. One can address that by adding an offset or XORing an offset. XORing creating a different set than adding. [0 0 0 1]+1=[0 0 10] while XOR([0 0 0 1],[0 0 0 1])=[0 0 0 0]. Accordingly, with an offset one may create at least (2*n)*k! different shuffles for $n=2^k$. A "reason" why one is limited is that a rule in shuffling bits in a word is so much smaller because the number of bit positions is of course smaller than the cardinality of the set.

This may seem disappointing for the set for n=256 for instance. In that set the number of 256-state inverters is in the order of $10^{500}$. But the number of bit-shuffles is only 2*256*8! or a respectable 20,643,840, but small compared to 256!.

The advantage of bit-shuffling becomes apparent for bigger words like 32-bit words. For a $2^8$=256-state inverter, a lookup table contains of an inverter contains 256 bytes to store the inverter. Which is not a problem. For $2^{32}$-state inverters that is more demanding of storage requirements. But for shuffling only a 32-state inverter is required and there are at least 2*32! variations or about $4*10^{35}$ possible bit shuffle arrangement.

It is worthwhile highlighting the above. For instance a 1,000,000-state reversible inverter requires in Matlab about 3.4 Meg storage. Not "nothing" but very doable in standard computing devices such as PCs, laptops, tablets, smartphones and the like and other computing devices. Matlab generates these type of inverters easily and fast with invmil=randperm(n). The inventor recognized that the shuffling of chunks of data is independent of the size of the chunks. Thus, while it "seems" natural to shuffle chunks of bytes, that is not a requirement. One may shuffle chunks of 7 bits or of 9 bits or of any size that is deemed necessary. In fact, shuffling chunks of data that are different from the meaningful representation, further shuffles or disperses elements from their inherent meaning, making reconstruction without the inverter much more difficult, if not impossible.

The same applies for inversion. It is not required to invert a set of data as 256-state elements, even if the original documents or plaintext is constructed of bytes. One may consider a plaintext for instance as a series of 10 bits elements or other. One may then divide the data stream into a series of 10 bit equivalent element and invert the 10-bit elements with a reversible 1024-state inverter. One may then use a k-state inverter to shuffle elements of 7 bits for instance. Or any other useful shuffle and/or inversion. Of course one should take care of the right size of the number of elements. And one may, as needed, apply adding meaningless symbols such as nonces, to fill up a required number of elements.

One should be aware that the shuffling is of 2-state elements, and the exchange of for instance a 0 (or 1) in one position with a 0 (or 1) from another position has of course no effect on the cryptographic meaning. And the actual "confusing" effect of a shuffling depends on an arrangement of elements. For example the shuffle of [0 10 1] in accordance with rule [3 4 1 2] will generate again [0 10 1]. The chance of that gets lower with larger sets of bits. And still even lower when a set of bits is supposed to appear random as in AES or SHA-256/512 for instance. Preferably, a minimum of 8 bit size is preferred and yet a set of at least 32 bits is even more preferred and a set of at least 128 bits is most preferred.

FIG. 10 and FIG. 11 show two Matlab shuffle programs with offset that create rule based n-state inverters with k-state shuffle rules. The program in FIG. 10 provide a forward rule and FIG. 11 a reversing rule.

It is to be understood that forward and reversing are relative terms as the forward shuffle may be interpreted as the reversing shuffle of the reversing shuffle.

The actual inversion in an FLT is then: 1) representing an n-state element in its binary form; 2) apply the appropriate shuffle rule; and 3) convert the shuffled word back to an n-state symbol and 4) perform if needed the required n-state operation. It depends on the program representation if one converts back and forth between binary and n-state representation. A processor generally operates on binary words and the back and forth conversion may only be needed due to the programming language, such as Matlab, but may also be kept in binary in instructions closer to machine language.

The inventor tested the sets of shuffles with offset on FLT of addition and multiplication over GF(256) and others, and the resulting transformed functions indeed retain the meta-properties of the original function.

Use of Reversible Element Shuffling and Alternatives

Earlier the inventor has disclosed in U.S. patent application Ser. No. 18/741,663 filed on Jun. 12,2024, which is incorporated herein by reference that one may apply an n-state Maximum Length Feedback Shift Register (ML-FSR) with k n-state shift register elements, preferably in Galois configuration as an p-state inverter. Herein $n=2^q$ and the entire FSR covers k*q bits and thus forms a 2^(k*q) state reversible inverter. Thus a ML-FSR with 4 256-state shift register elements has 32 bits in its entire shift register. The FSR may shift to its original content after (2^32)−1 shifts. And the ML-FSR is a different inverter based on the number of shifts. The reversing inverter in the ML-FSR operating in a reversing direction. The ML-FSR may be implemented as a transition array. And for each number of shifts one may store or create an appropriate array. Assume that each shift may be implemented as an array A, then h shifts is A^h and reversing the inverter for h steps forward is A^-h or h steps in reverse.

The advantage of the ML-FSR is that with 1 array one has 2^tot−1 different inverters with tot the number of bits of the total shift register with basically 1 array A. The inventor also described how one may modify the ML-FSR by using the FLT. In the array multiplication that means using the n-state reversing inverter of the FLT to transform the elements of array A to At and then use the FLTed addition and multiplication of the array-vector multiplication to create the FLTed ML-FSR (the vector being the content of the shift register).

This allows transformation of large sets of bits. Sets of 800 bits can easily be transformed. In according with an aspect of the present invention one may also modify large sets of bits with the bit-shuffling approach as disclosed earlier above.

One may apply n-state inversion or n-state shuffling in any cryptographic operation that includes processing a set of bits or n-state elements. In particular encryption/decryption and hashing operations may be transformed. One application is the element shuffling in encryption such as the Advanced Encryption Standard (AES). There are several AES modes defined in NIST issued FIPS standards. And element shuffling, because it generally is reversible, may be applied in most symmetric but also asymmetric encryption. Or at least where exchange of data takes place.

One concern with any modification of known encryption is if it will create insecurities and/or a bias towards certain elements, which would enable certain attacks. Element shuffling is at least as good as using the original, unmodified, method and actually more secure because it introduces a novel and secret uncertainty. Furthermore, shuffling does not change the content of the shuffled elements. Only the order of elements is changed, not the content.

Suppose one has a sequence equivalent to p bits. One may use a p-state reversible inverter for shuffling. One may also divide the p bits in n=p/k words of k bits. One may then apply an n-state reversible inverter to shuffle the n k-bit words. On top of that one may also shuffle with a k-state inverter the k bits in one or more words of k bits. In accordance with an aspect of the present invention, one may apply further layers of shuffling. For illustrative purposes one or more examples will be provided in AES-GCM of bit-shuffling and n-state element shuffling.

Using Matlab AES-GCM by David Hill downloaded from https://www.mathworks.com/matlabcentral/fileexchange/102850-galois-counter-mode-gcm-block-cipher-using-aes, which is incorporated herein by reference including all executable instructions. AES-GCM is AES in Galois Counter Mode and is generally used for encryption decryption of multi-block plaintext, a block being 128 bits or 16 bytes long. In AES-GCM the AES part is applied in forward direction to generate a keystream which is XORed with the plaintext. The basic structure of AES is assumed to be known of ordinary skill in cryptography, and is described in FIPS-197 published by NIST. AES-GCM has several inputs, at least a key, an initial vector IV, an added input for authentication and of course plaintext.

The same parameters as in Hill are used:
key='44a74c1a57da2bf6d6838956cdca13f1b67cc6-qad87d459bff544784083868171';
iv='4392367e62ef9aa706e3e801';
plainTextInput='I like to read!';
aad='additional unencrypted instructions';

The plaintext message was changed to 'I like to read!'

One should keep in mind that the AES instructions in AES-GCM are used to generate a keystream and need not to be reversible. AES has several steps it always performs. One is the Key Expansion which applies the key of 128 or 256 bit to be expanded for instance in a key array of 240 bytes. A key array is used from the key expansion as a round key. Each round in AES is applied to a state array which is an array of 16 bytes commonly represented as a 4 by 4 array of bytes. Each round also use a round key of 4 by 4 array or 16 bytes. In the applied program, the state is represented as a 256-state element array.

In a first example, the 4 by 60 (=240) 256-state array of the key expansion created in one mode of AES, is shuffled by a 240-state reversible inverter created by inv240=randperm(240) for instance in Matlab. The shuffling is executed by first creating a first single row array of 240 elements from the array, then creating a second single row array wherein element of the first single row array (i) are moved to position ind=inv240(i) in the second single row array and the second single row array is converted back to a 4 by 60 array.

In an illustrative example the 240 byte key expansion array is generated from the following 256-bit key (or 32 bytes) key='44a74c1a57da2bf6d6838956cdca13f1b67cc6-ad87d459bff544784083868171'.

The output in Matlab of the array is a 4 by 60 256-state array, but is too large to be shown herein in its entirety. For illustrative purposes only the first part being 4 rows with 10 columns of the generated Key Expansion array is shown in a screenshot outputted by a Matlab program in FIG. 12.

In accordance with an aspect of the present invention the 256-state elements of the array are being shuffled based on reversible 240-state inverter inv240=[123 99 174 32 40 22 175 . . . 57 122 10 12 226 118] of which only the first and last 7 elements are shown as 256 elements would just confuse by its large number of elements.

The modified Key Expansion array based on that shuffle in partial form (4 rows of first 10 columns) is shown in the screenshot in FIG. 13. The modification is applied both in encryption and decryption in AES-GCM using the key, aad, and IV of the Hill Matlab program mentioned earlier.

The ciphertext generated without shuffling is C='6deb6e66165c0f8d85369bb6d2051d' in accordance with the Hill example. Using the shuffling of 256-state elements with inv240 generates ciphertext C='9fe6d6dfebada5923e998245142996'. This demonstrates the security effect of n-state inverter based k-state element shuffling.

In accordance with an aspect of the present invention, the Key Expansion array is modified by bitwise shuffling. This is done as explained above by first arranging the 2D array into a single array, then represent all 256-state elements by its 8-bit words and concatenating all bits into a 1920 bit sequence then re-arranging into their sequence of 256-state elements and re-arranging into the applied 4 by 60 modified array. One may generate simply a 1920-state reversible inverter by inv1920=randperm(1920) to generate for instance inv1920=[1462 97 1857 1070 1005 1324

1003 951 . . . 1266 578 869 491 631 1503 1363 202] showing the first 8 and last 8 elements of the generated 1920-state reversible inverter. Using this inverter to shuffle the bits in the Key Expansion array, creates a modified Key Expansion array showing the 4 rows with 10 columns in FIG. 14.

This modified Key Expansion array together with other identical inputs generates the AES-GCM ciphertext: C='90a420cb55a362f80a1325146d84ac', which is again different from the original ciphertext. Also, the authentication tag will be modified by the shuffling. However, as all AES parameters stay the same for corresponding encryption and decryption, the decryption and authentication work fine under these shuffles.

In accordance with an aspect of the present invention one applies at least two shuffles to a set of n k-state elements. That is: one applies an n-state inverter based shuffle on the n k-state elements and then do a bitwise shuffle on the shuffled n k-state elements. One may also change the order of these different shuffles with usually different outcomes as the combination of shuffles are not associative and the order of execution matters. One may also apply a k1-state shuffle followed by a k2-state shuffle wherein k1 and k2 are different. For instance one may use the 240 element sequence of bytes or 240*8 bits and create a sequence 0f 274 7 bit words and shuffle with a 274 state inverter based shuffle, reconstruct the bit sequence and shuffle again based on 11-bit words with a 174-state inverter and reconstruct again the binary representation, of course taking into account any remainder bits.

The Matlab screenshot in FIG. 15 shows the parts of the Key Expansion array generated first by inv240 byte shuffle followed by the 1920 bit shuffle. This transformation generates ciphertext C='792436e412e25599f11fe2a85255dc'. The result of first doing the 1920 bitwise shuffle followed by the 240-state byte shuffle is shown in screenshot of FIG. 16 and generating ciphertext C='4274f2798d0cc0d83350c369045657'. With the screenshots showing of course only parts of the generated Key Expansion array.

One may also shuffle the bits as words of an 2^k1-state element (k1 bits per word) or any other shuffle rule that one may come up with. For instance, one may shuffle the odd positions with one rule and the even positions with another rule. Or any other shuffle rule that one may come up with.

In the above disclosed shuffle, one shuffles all elements (be it k-state elements or bits or other rule) of the entire Key Expansion array. This means that in the AddRoundKey( ) module of AES only shuffled keys are applied.

It may be advantageous to only selectively per round modify the key. In that case one may shuffle the 4 by 4 256-state key array taken from the Key Expansion array. However, one may also create a separate and stored shuffled Key Expansion array and apply selectively only for certain rounds the relevant part to be the applied Key Array. In the Hill program this was done by the following:
    state=AddRoundKey(state,w(:,1:4));% conducts first round
    for k=2:(Nk+6)% conducts follow-on rounds
      state=SubBytes(state);% per standard
      state=ShiftRows(state);% per standard
      state=MixColumns(state);% per standard
    if k==9
      state=AddRoundKey(state,w2(:,4*(k−1)+1:4*k));
    else
      state=AddRoundKey(state,w(:,4*(k−1)+1:4*k));
    end
end The above shows in Matlab that for k=9 (round 9) the key is selected from w2 which is the 1920 binary/240 byte-wise shuffled Key Expansion array. One may do this for one or more rounds, with the same of different shuffles. The ciphertext generated with the single round 9 modified key array is C='7209319a07fabb6206a9e0e8122bf5'. Because of the inherent avalanche effect of AES, even minor changes and modifications has major effects. One may apply one or more shuffles and/or inversions of elements in a single round, in multiple rounds or even all rounds in encryption and in hash operations. One may change the k in the KeyExpansion module to generate more, for instance 256 bytes, in that case in a 4 by 64 array, which is in essence a sequence of 256 bytes sequence, which may be used to derive a 256-state reversible inverter.

One may also shuffle the 'state' array. One may do that standard for every round, for selected rounds, for all modules SubBytes(state), ShiftRows(state), MixColumns(state) and/or AddRoundKey(state), or for selected modules in selected rounds. One may shuffle before or after execution of a module, etc. One may shuffle bits and/or bytes and/or any n-state representation of bits. One may shuffle all bytes or bits in a state array or just a part like a row and/or a column in the state array or any selection of bytes or bits. The avalanche effect will affect the generated ciphertext and make it significantly different from the unshuffled data, The following Matlab instructions show the shuffled state array applied to the MixColumns( ) and AddRoundKey( ) modules in round 9:
    for k=2:(Nk+6)% conducts follow-on rounds
      state=SubBytes(state);% per standard
      state=ShiftRows(state);% per standard
    if k==9
      state=shufstatebin(state,invn);
    end
    state=MixColumns(state);% per standard
    state=AddRoundKey(state,w(:,4*(k−1)+1:4*k));% per standard
end The result is a ciphertext C='8e0d5089d9e89110f116741dd76d57'.

The above discloses transformation of a set of data by shuffling. This means that the overall statistical make-up of the data is not modified, just the order of symbols is changed. A combination of two shuffles, the set represented as bits and the set represented as a set of words of 2 or more bits does in fact change the non-binary makeup, but not the binary make-up. Thus, like in the FLT, the shuffling does not introduce a bias towards a specific representation.

As presented above, one can shuffle an entire data set, including the key, a nonce, and/or the plaintext at the start of a cryptographic operation like AES-GCM encryption. But one may also selectively transform data by shuffling on a very selective part of an operation or function in the cryptographic operation. For instance on part of a set of data or on one or more rounds or one or more modules in a round or any partial modification. An objective behind a partial or selected modification is that the systematic (statistical or bias) effect if any, will be limited to one of many operations. As such, when kept secret, it is difficult that a modification was made. It also is very difficult to determine where (in which round or module) a modification was made, from only the ciphertext. So a detectable negative effect, which is actually not believed to exist, would then be limited to a small part of the entire cryptographic operation, for instance to 1 module in one of 14 rounds in AES-GCM.

However, the output effect in modifying the output due to the known avalanche effect of the entire cryptographic operation, the ciphertext or for instance a hash, is significant and dramatically increasing the security (or resistance against successful attacks) in practical application with limited modifications. Yet another benefit is that this applies also to standardized cryptographic operations like AES-GCM. And an attacker or malfeasant who obtained or broke standard parameters such as Initial Vector, Nonce and/or key, still would be unable to successfully decrypt the ciphertext with the standard parameters.

In addition to shuffling one may also apply a k-state inverter to invert k-state elements in a set or sequence of data. Such an inversion does change the binary make-up of a data-set. But such a change falls well within effects of other possible changes, such as in operational key or plaintext, and the natural variances in a plaintext, so that certainly a limited use of a reversible k-state inverter is not detectable in or from the secret ciphertext. In addition, one may divide a series of bits up in words of k1 bits instead of the use of words as applied in the plaintext. Plaintext text documents uses ASCII characters or 8 bit bytes. By inverting 7 bit words as 128-state elements or 10-bit words as 1024-state elements, one further mixes bits.

In following illustrative examples a sequence of p bits is divided in corresponding n k-state elements with $k=2^q$ and thus $p=q*n$. This is done for convenience, not for necessity. One may use shuffles that doesn't shuffle all bits or all k-state elements. In most cases a shuffle and/or inversion of a limited set of elements is sufficient for affecting a significant output change. Theoretically, a k-state inversion of 1 element or a shuffle of 2 elements is sufficient to affect a dramatic change in ciphertext or hash. In order to have an illustrative comparison all elements are subject to shuffle or inversion in the following examples. With the understanding that one may select only a limited number of elements to modify or shuffle, up to a complete set as defined by a block or array (such as the state array) or an S-box or pre-defined constants as in SHA-256 for instance.

The shuffle and/or the inversion operations are generally not associative and thus the order of the shuffle and inversion operations has to be observed if one wants identical results for encryption/decryption and/or if wants to reverse operations. This also has as a consequence that repeat use of a shuffle or inversion with an intervening operation, usually will provide a different output in a chain of shuffle and or shuffle/inversion operations.

The modifications will affect the generated ciphertext in AES, AES-GCM, ChaCha20 and the hash in SHa-256, SHA-512, SHA3 and Keccak versions. Rather than confuse a reader with different outputs, the following illustrative approach is applied.

In a first example a 4 by 4 array of bytes will be shuffled and inverted in different order of operations. The operations are: 1) S_16 or shuffling of 16 bytes based on reversible 16-state inverter inv16; 2) S_bin128 or shuffle of 128 bits (being 16 bytes) based on 128-state inverter inv128; and 3) I_256 or 256-state inversion of each of 16 256 state symbols in the data set based on 256-state reversible inverter inv256.

Figures 17, 18, 19, 20:
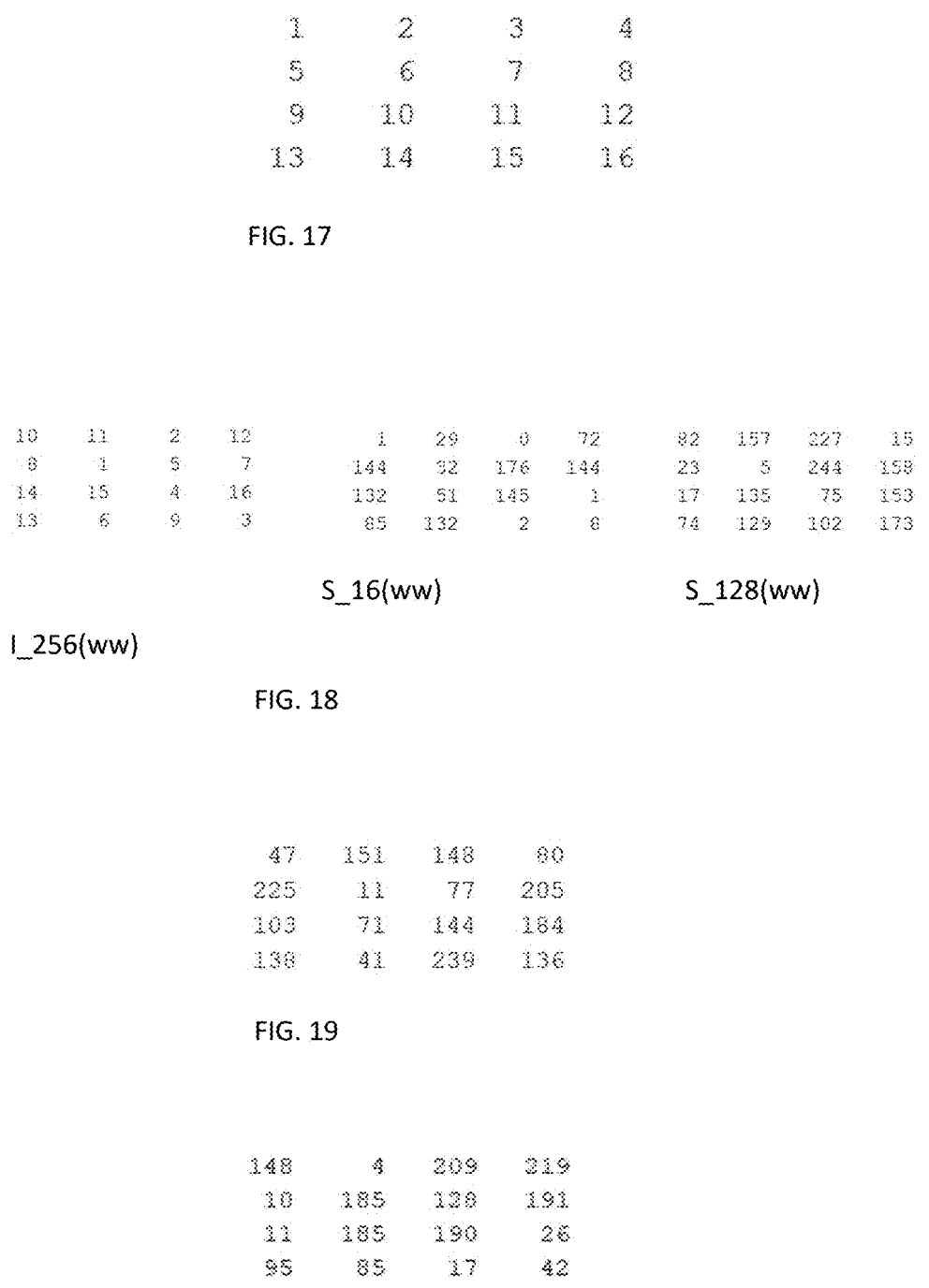

The data set is initially presented as a 4 by 4 array of 256-state elements and is shown in FIG. 17 as a Matlab screenshot. A very simple sequence seq=1:16 is read into consecutive rows. For shuffling the initial order is important and in this example the array is read row by row into a sing row array, shuffled and moved back into an array. An additional shuffling may be applied by putting a shuffled single row array back into a 4 by 4 array by filling columns, which amounts to additional shuffling.

The following inverters in Matlab origin-1 are used:
inv16=[6 3 16 11 7 14 8 5 15 1 2 4 13 9 10 12]
inv128=[61 124 22 9 89 31 71 29 53 32 47 34 64118 104 86 48 38 97 127 63 24 88 49 85 128 19 93 101 8 66 106 20109122112 73 110 59 79 126 6 68 116 94 65 100107 50 54 56 77 74125 102 60 45 44 95 28 12103 67 23 1 11 27 40 33 55 82 75 90 18 108 117 105 123 14 111 15 58 99 42 57 39 81 84 92 30 83 7 80 26 3 37115 72 10 2 43 52 17 36121 35113 465198 16120 91 215 4 13119 70 76 694125 96114 78 62 87]
and
inv256=[107 83 158 228 16 24 6 245 159 18 136 76 154 75 130 103 174 96 111 225 149 19 249 105 255 212 144 220 39 132 80 150 120 253 52 124 119 53 99 85 38 89 160 202 14 117 170 133 208 29 168 200 61 195 219 44 201 203 97 198 238 155 233 131 134 147 58 62 56 46 54 213 113 250 216 226 91 118 35 17 70 166 221 196 180 205 87 22 222 251 84 141 42 60 189 127 65 156 243 171 143 186 73 26 146 12 242 112 129 148 214135 1223 207 115 20417825 21110431179951642348219764177231239 1403013940 47224181182128237887718810123616551168 1231927481153 232 122 67 43 194 215 90 217 63 126 193 240 172 185 32 163 161 256 92 37 13 5 9 2413625216993 2148 1533 218 25423016211167944572347110 27 108 176 78 173 145 3 86 184 28 248 114 227 187 57 109 183 157 20 100 66 55 199 7 125 110 121 191 246 49 142 137 209 116 247 98 2 69 206 229 59 175 8 79 190 151 138 23 152 50 4 41 106 235 210 244 102]

The initial array is called 'ww'. The screenshots in FIG. 18 show the results of shuffles/inversions S_16(ww), S_128 (ww) and I_256(ww).

Figures 21, 22, 23, 24:
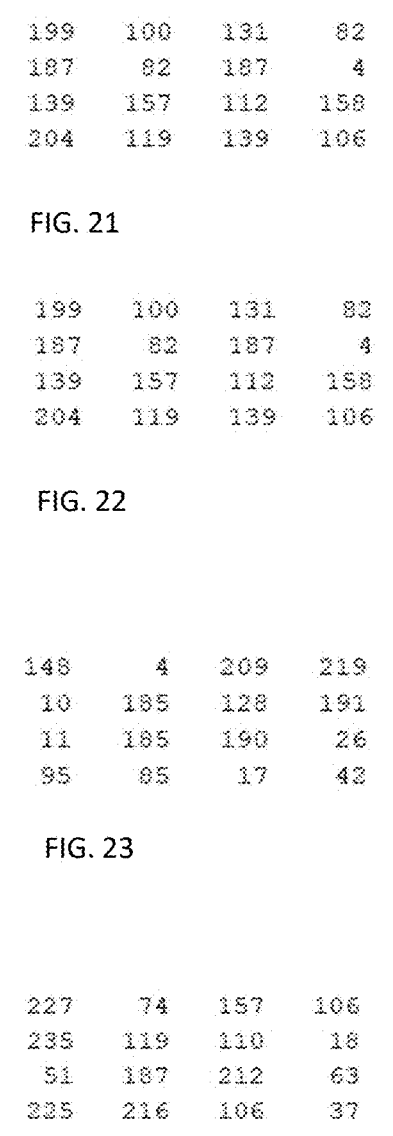

FIG. 19 in screenshot shows the result of I_256/S_128/S_16; FIG. 20 in screenshot shows the result of I_256/S_16/S_128; FIG. 21 in screenshot shows the result of S_128/I_256/S_16; FIG. 22 in screenshot shows the result of S_128/S_16/S_128; FIG. 23 in screenshot shows the result of S_16/I_256/S_128; and FIG. 24 in screenshot shows the result of S_16/S_128/I_256.

One can see that 2) I256/S16/5128 and 5) S16/1256/S128 and 3) and 4) are associative in the sense that 1256/S16 and S16/1256 provide the same output.

One can avoid such associative results by using inverters of different cardinality. For instance, one may apply (instead of a shuffle based on 8-bit or 256-state elements), a shuffle of 4-bit or 16-state elements using thus a 32-state inverter to shuffle 32 16-state elements in a 128 bit sequence. Or one may apply a 128-state inversion (not a shuffle) on elements of the array. This can be done by 1) re-arranging the 4 by 4 array of 16 bytes, into a one dimension sequence of 128 bit; 2) divide the 128 bits into 18 consecutive words of 7 bits or 126 with a remainder of 2 bits; 3) represent the 126 bits as 18 128-state elements. 4) create or generate, for instance with inv18=randperm(18) a 18-state reversible inverter; 5) shuffle the 18 128-state elements based on the 18-state inverter; 6) convert the consecutive 128-state shuffled elements into their binary representation, with the 2 unmodified bits; and 7) re-arrange the 128 bit sequence into a 4 by 4 array of 256-state elements by first dividing the sequence into consecutive words of 8 bits, of which there are 16, of course.

One may use different divisions of data. Even ones that leaves remainders. One may also repeat using of same or different shuffles or inversions with appropriate intervening operations.

In accordance with an aspect of the present invention, the above combination of shuffles and/or inversion may be applied reversibly to data. AES has several modes it may operate in, defined in NIST issued specifications SP 800-38A, SP 800-38B, SP 800-38D, SP 800-38E, SP 800-38F and SP 800-38G which are incorporated herein by reference and are known and/or familiar to one of ordinary skill in the art of cryptography. Certain modes are 'one-way' like AES-GCM and others are reversible, like AES-CBC for instance.

The above illustrates how internally AES may be modified with element shuffling of key and/or state data.

A weakness or potential weakness in AES-CTR and related encryption such as AES-GCM is that the plaintext is processed in blocks of 128 bits and that each block with exception of an updated counter applies the same parameters, including the same Key Expansion array. In accordance with an aspect of the present invention, the Key Expansion array, generally a 4 by 44 a 4 by 52 or 4 by 60 byte array. The galois counter module in AES-GCM implementations such as the above mentioned Hill Matlab implementation, but also in others (often called GCTR), often re-computes the Expansion Key array from the secret key for every new block. Even though it is the same array for every block. In accordance with an aspect of the present invention, the re-computed or stored Expansion Key array is modified with an inverter, preferably a reversible inverter. The inverter may be a k-state inverter corresponding to the state of the elements in the Expansion array, for instance k=256 and elements are inverted individually. The inverter may also correspond to a number of elements in the Key Expansion array, like n=240 and the elements of the Key Expansion array may be shuffled in accordance with the inverter.

It is known that the size of a plaintext may be large, like 100 MB or larger, as a file that needs to be encrypted. While not impossible, it will require storing a significant number of inverters if one wants to modify the Key Expansion array for each block in a large file. In accordance with an aspect of the present invention an inverter itself is used to generate a new inverter that likely is different from previous inverters. There are of course k!(factorial of k) different configurations of a set of k unique elements, including identity invk_ind=[1 2 3 4 . . . k−1 k]. For the Key Expansion array of 240 256-state elements that seems like a large number. One may also invert the elements itself with a 256-state inverter.

A file of size 80 MB to be encrypted would require 80/16 million blocks of 16 bytes or 5 million blocks. It would be somewhat of a challenge to store 5 million 240-state inverters, in order to modify each block in a completely unique manner by the recommended above transformation. In accordance with an aspect of the present invention, an initial k-state inverter is applied to generate a next k-state inverter to modify encryption of a next block, for instance by shuffling or inverting elements of the Key Expansion array.

In Matlab that can be achieved by initiating a k-state inverter invkstart and make a copy invkb=invkstart. One then for each block generates invkb=invkstart(invkb) as a next k-state inverter. The earlier statement means invkb(i)=invkstart(invkb(i)). One may also use other variants like invkb=invkb(invkstart).

It may upfront not be entirely clear that a 'next' inverter is also a different inverter. For instance there are 24 (2*3*4) different 4-state inverters. However, there are only a maximum of 4 different inverters 4-state inverters generated from any of the possible 24 starting inverters. That seems disappointing, as it is as good as a shifted 1 position 4-state inverter which returns to its original start after 4 shifts. A rotation or shifts of a 240-state inverters would provide 240 different 240-state inverters. Not enough for 5 million blocks.

A similar trend occurs when k is made larger. But up to k=7 the number of 7-state inverters inverted by itself seems not to increase significantly relative to k. However and luckily that starts to change when k is greater than 7. The number of generated inverters before repeat suddenly starts to increase significantly. Here the "combinatorial explosion" starts to work to our benefit.

For n=240 the self-inversion a explained above in some cases generates over a billion different inverters before the identity or itself is reached again. As an example the 240-state inverters inv249start=[132 149 180 44 218 3 25 209 63 184 90 225 105 9 14276157 271717021016716619050317 2 723915402411130231521852 0 32 49 35 101 56 232 141 133 120 28 161 78 83 182 197 70 91 116 109 100 113 183 204 47 179 222 58 178 220 173 151 53 118 192 140 48 43 159 84 186 148 206 81 26 156 202 195 55 235 39 5 57 4 45 187 117 112 143 207 54 61 60 234 73 212 80 223 171 121 177 87 219 51 103 224 147 176 97 163 136 10 217 115 196 96 237 129 233 201 134 194 213 104 125 199 79 16 85 162 22 52 34 139 30 189 12 221 122 227 128 106 153 229 200 102 92 111 181 160 93 169 36 88 127 124 193 203 98 65 138 146 144 135 188 74 205 33 14191387523122613768 94 8 21722288241108131296217413211582 36 16415423021416595211238992161682156937467767175 71 1145114198 155 19 18 123 59 42 89 107 6 66 208 150 240 64 119 86 110 126] using invkb=invkstart(invkb) achieves over a billion results before the starting inverter is reached again. This does not necessarily always mean that all generated inverters are different, as this method has some internal branches. This means that there may be shorter series of inverters generated if one starts with a different inverter in the sequence. That is, once a sequence as above is found one may execute invkb=invkstart(invkb) but with invkb as start being a later inverter generated but still using invkstart to modify.

However, in most cases one can easily check that over several billions of unique k-state inverters are generated. Practically, it may mean that one has to run a program that uses different starting inverters and checks if the starting inverter is reached after a preset cycle of for instance 3 billion. Most 240 state inverters run at least for 100s of millions generated different inverters before the starting inverter is generated again. This slows down the overall process. But experience shows that for n greater than 128 when running overnight always a 1 billion cyclic inverter is found. This was done in Matlab on a Windows 10 PC. Furthermore, it seemed initially unlikely that so many different sequences of unique inverters are and can be generated. But closer examination of the relevant numbers shows why. It seems that a series of 1 billion different inverters is quite large. But one should view that in the context of the large number of possible inverters. That number for n=128 is factorial of 128 which is about $3*10^{215}$. And while 1 billion ($10^9$) is large, it is a mere spec if even that in such a large universe. And the chance to duplicate that is extremely small, to be close to non-existent.

Furthermore, Matlab as well as other Big Integer computer programs have really no immediate limit is the size of k. That is, the inventor generated in a similar way a n=65536 state reversible inverter with a cycle of about 19 billion. The process was also completed overnight of a Windows computer in Matlab. The storage of this inverter takes about 3.5 MB, which is small in the context of available memory and/or storage. The availability of such self-propagating k-state inverters for k=65536 is relevant in the context of shuffling elements in a 256 by256 elements 256-state array. It allows a whole range of different arrays to be created. Even though one has to keep in mind that with 65536 256-elements particular elements appear multiple times and not all shuffles may be unique.

The above is called self-generation or self-propagation of inverters herein. How is the large number of self-generating inverters achieved? Especially because not all starting inverters self-generate long extended different inverters. One way to find a set of a large number of generated inverters is by randomly generating starting sets, for instance by using in Matlab inv240start=randperm(240) for k=240 and invkstart=randperm(k) for other values of k. For the k=240 the inventor applied a loop of 50 trials and stopped a trial loop once a newly generated inverter invknew==identity or invknew=invkstart. All loops generated at least 2 million different 240-state inverters. In order to find the invkstart starter inverter that generated the most within the check conditions, a maximum counter was maintained and only the starting inverter with the highest count was maintained and saved, for this example. The result on a standard Windows computer was generated within about 20 minutes. One may also set a minimum condition like tel==100,000,000 and let the test program run until it finds a fitting 240-state inverter. Also this worked fairly easily as indicated earlier.

A similar approach may be taken for an 8*240=1920-state inverter for bitwise shuffling and for k=256 for byte inversion. This is change upon change. And one may apply the modification to one or more or to all rounds.

For instance, using plaintext='I like to read!I like to read!I like to read!I like to read!I like to read!I like to read!' has a size of 6 blocks of 16 bytes. When the inv240start is identity, no Expanded Key array is shuffled and the generated ciphertext is Ci='6deb6e66165c0f8d85369b-b6d2051d4ca7f25733d8432306e112413bff4a2a5281d0914f ac2e0d74dc6ef7568213beaa2da18f7192baa17cb2d07a-e8181235bfb554d06d82430ba6 7e7e7fba4c0057ef729751575bf845a78edfb0ccd6ebe4' in bytes.

The Hill Matlab program decrypts and validates it correctly. Using an earlier above provided self-generating or self-propagating inv240start, creates ciphertext C='8905a95771f059021f7924475be4b029ca8322-76c4f7f8b074007fecca69c4d4ab4e1a210 85a4c282fce8b537eb1b31a080b3237a3e2c3ae40034d7-ccbecc6842c77ac50388d3f6719 1ad085cfb1fd5530184d8811e61c90a4ae7f7e70df76'. This is different from the original ciphertext, but equally random. Furthermore, the modified Matlab program correctly decrypts and validates.

For review purposes the inventor also printed intermediate results. These show that for each block a new and different inverter was generated created a novel and modified Expanded Key array. One may shuffle the original Key Expansion array or one may shuffle a previously shuffled Key Expansion block. One may also apply the shuffled Key Expansion block for one or more rounds, for instance for applying it as a shuffled Key array for a AddRoundKey( ) operation. And one may use multiple shuffles and/or inversions for modification. However, the state array is only 128 bits and may not be large enough for self-propagating inverters. One may use 4 bits words for shuffling, but this brings the 128 bit only to a 32 element sequence and thus 32-state inverter. It will still change the state array, especially when combined with a 256-state inversion. The effect of modifying the original Key Expansion array and using a corresponding key array therein for AddRoundKey( ) is an effective way to selectively modify over a very large range of modifications of the Key Expansion array. One may maintain the original Key Expansion array for one group of unchanged rounds and the modified Key Expansion array for one or more selected rounds.

One may also apply the shuffle and/or shuffles and/or inversions on the State Array in a round or in multiple rounds. Or in any appropriate data transformation, for instance on the S-box in AES.

While examples are provided for AES in Counter Mode or Galois Counter Mode, one may also apply these methods in other modes such as reversible modes. The inversions and shuffles as explained herein are all reversible and thus are reversibly applicable. Furthermore, one may run the self-generation of inverters also in reverse and/or switch direction of generation at a predetermined point. One may also apply the self-generating process to a non-reversible inverter.

One may apply a similar method of shuffling and/or inversion to all or part of the ChaCha20 encryption method. For instance, in ChaCha20 as defined in for instance RFC 7539 which is assumed to be known to one of ordinary skill, the state array is a 4 by 4 array of words of 32-bits. The second and third row of the state array are formed from a 256-bit key. For each block of plaintext that is to be encrypted the same input state array is applied, except for a counter word which is updated for each block. One may shuffle or invert any word of withs or series of words as desired by the aspects of the present invention, disclosed above herein. Considering the possible variations, it seems worthwhile to shuffle at least 128 bits or perhaps a row or a column of a ChaCha20 state array. As in AES-GCM, the state array is used to generate a keystream and needs not to be reversed. If one doesn't want to change the binary distribution of bits in a state array one may stick to shuffling.

One may also apply k-state inversion. And as in AES-GCM the ciphertext in ChaCha20 is formed by bitwise XORing keystream with plaintext. One may treat a bit stream as a stream of n-state elements and apply a reversible shuffling and or inversion on these elements or an p-state shuffling on sequences of p bits as explained herein. One may leave even some bits not changed if n is not a power of 2. The modified bits or elements offer sufficient modification.

One may see the above as applicable to standard encryption and data exchange, including PKI methods such as RSA, DH and elliptic curve based methods. But these shuffling inversion methods may also effectively be applied to novel, post-quantum data exchange such as disclosed in FIPS 20 and FIPS 204, and/or other lattice based data exchange, including isogeny based methods, and other for instance learning with error methods. One problem with novel PQ methods is that they are unproven relative to other older methods and they require often larger data words to be processed. A shuffling step applied to data exchange allows for smaller words or data sequences while providing superior security.

As observed before, a linear increment of a counter as used in AES-CTR/GCM and/or in ChaCha20 and its variants XChaCja20 and Salsa20 while leaving all other parameters unchanged in a multi-block encryption, may not be secure. A counter may be 32 bit is size. In accordance with an aspect of the present invention, such a counter may be inverted with an n-state inverter. One would like to prevent or at least minimize the re-occurrence of a same counter state. One may use a maximum-length FSR as taught herein. The ML aspect prevents any repeat within the cycle length of the FSR. Another, effective, but not entirely guaranteed repeatless counter, is to perform an n-state inversion on the counter. For instance one may consider a 32-bit word a combination of 4 bytes of 8 bits. One may invert each of the bytes then with a 256-state inverter. This may be preceded or succeeded by an increment with a constant factor. One may perform the increments of the 4 256-state elements in a modulo-256 based increment.

For each next block one may use a thus updated counter and the same n-state inverter. One may also update the n-state inverter for each block in the manner of a self-propagating n-state inverter. For ChaCha20 and its variants, one may also n-state invert more than only the counter as described above. One may invert one or more of the nonces or of the constants or even the key. As long this is done in a repeatable and agreed upon way, one may apply it in both encryption and decryption.

The above shuffling and/or inversion methods also apply to hashing such as SHA-256/SHA-512 and SHA-3 and SHAKE and others. Certainly, SHAKE and SHA-3 use large state arrays and several rounds (24 in SHA-3). SHA-256 operates on blocks of 512 bits and SHA-512 on blocks of 1024 bits which may be inverted and/or shuffled in one or more rounds and other modifications as disclosed above. Similarly, one may shuffle/invert the 256 bit output of SHA-256 and the 512 bit of SHA-512. This creates private or customized hashing. A similar modification may be applied to known signature methods in data exchange or to internal sequences or data series or blocks or words or bits that are processed.

The above applies to direct modification or transformation of data. It may also be applied to functional transformation. For instance, one may apply the self-propagating inverters to the inverters that are applied to an FLT as illustrated in FIG. 1. This means that one may FLT the functions in for instance AES and/or ChaCha20 and/or hashing such as SHA-256 and SHA-512 and/or SHA-3 in a virtually infinite (well billions) number of instances of modified cryptographic primitives. In fact, every modification that applies the FLT may be supported by such self-propagating inverters.

One may notice that self-propagating n-state inverters are often limited in their cycle length. While theoretically the number of different reversible n-state inverters is factorial of n (n!) the cycle of self-propagating n-state inverters is usually smaller than n!. On a positive note: the overall and maximum cycle length increases significantly with greater n and follows a trend of a combinatorial explosion. One may conclude that the cycle length of an (n+1)-state self-propagating inverter may be greater than of an n-state self-propagating inverter. And that such an (n+p)-state inverter may have a significantly greater cycle than an n-state one. With p being a fraction of nm for instance n=256 and p=5 or greater. Of course an (n+p)-state inverter has p,ore states than an n-state inverter and cannot be used for n-state purposes.

In accordance with an aspect of the present invention an n-state inverter is derived from a self-propagating (n+p)-state inverter. There are several ways to do that. As illustrative examples 2 different methods are explained. But other methods are possible and fully contemplated.

In a first method an (n+p)-inverter which may be a self-propagating inverter is reduced to an n-state inverter by removing all elements greater than n. For instance assume n+p=20 and generate inv20=[13 14 3 8 11 19 18 17 20 7 5 15 6 4 12 10 2 16 19]. One can create a 7-state inverter by removing all elements >7 to achieve inv7a=[3 7 5 6 4 2 1]. A second way is to remove all elements smaller than 14, which creates [14 19 18 17 20 15 16] and subtract from all values 13 to generate inv7b=[1 6 5 4 7 2 3]. Yet a third method is first taking the first 7 elements from inv20 being [13 14 3 8 11 19 18] then list the elements >7 being [13 14 8 11 19 18] or in order [8 11 13 14 18 19]. Then list the elements in [1 2 3 4 5 6 7] that do not occur in the first 7 elements of inv20 which is [1 2 4 5 6 7] which replaces [8 11 13 14 18 19] leading to inv7c=[4 5 3 1 2 7 6].

This inverter extraction has at least 2 benefits. The first benefit is that one is able to extract more n-state inverters from (n+p)-state inverters than in certain cases is possible by using an n-state self-propagating inverter. The 7-state example illustrates that as only a small number of different 7-state inverters may be generated by a 7-state self-propagating inverter. The number of different 20-state inverters generated by a 20-state self-propagating inverter is greater than the 7-state case. And while one may generate some 7-state duplicates the total number of 7-state inverters extracted from 20-state inverters is much larger than the number generated by a 7-state self-propagating inverter. A second advantage is that it is difficult to reconstruct the generating (n+p)-state inverter from the extracted n-state inverter, even if it is known what the extraction method is. And thus an extracted n-state inverter say nothing (or very little) about the next extracted n-state inverter. Which of course increases the security of using self-propagating inverters.

The inventor teaches and discloses in U.S. patent Ser. No. 18/908,321 (the "321 application") to Peter Lablans filed on Oct. 7, 2024 which is incorporated herein by reference a computational function transformation by including and/or modifying an n-state carry generating function, which is preferably random-like in appearance. To briefly re-explain how that works the example of byte-wise XORing as applied in AddRoundKey( ) in AES-CTR and/or AES-GCM and/or ChaCha20 will be used. That example is used because it uses a one-way repeatable approach for generating a key-stream. For instance the AES part in AES CTR/GCM is used to generate a keystream applied both in encryption and decryption. The inventor recognized that this allows the use of one way functions in AES, which otherwise are reversible operations. AddRoundKey is an example of that. In fact AddRoundKey is an involution as both encryption and decryption applies the same functionality.

AddRoundKey( ) in AES as set in FIPS-197 is a bitwise XORing of words of bits in a 4 by 4 byte array in the Key Expansion array and the 4 by 4 byte State Array, as one of ordinary skill in cryptography knows. FIPS recommends XORing corresponding columns in the two arrays. In fact if it is done by rows or columns doesn't matter as the XORing is a carry-less bitwise operation. The inventor gave it a slight twist by considering the byte-wise XORing as being represented by an addition over $GF(2^8=256)$. The 321 application then does a computational function transformation, by transforming for instance the addition over GF(256) of 4 256-state elements (the 4 bytes in a column of an array) as a radix-256 carry propagating operation. The radix-256 aspect indicates that the addition (like a carry ripple addition) has a repeat of two parts: 1) generate a 256-state residue of 256-state elements in augend and addend, followed by determining carry elements, and creating a new residue until no more carry elements are propagated. This causes the carry to ripple through the partial sums, hence the name carry ripple addition.

The 321 application applies a completely random or random-like carry function, which may in the 256-state case be a 256 by 256 256-state lookup table, wherein the elements may be any of 256 states. This is of course different from the standard carry ripple adder wherein the carry is only 0 or 1 (when working in origin-0). The 321 application explains that this approach does not change the distribution of the outcome sum, which remains flat or uniform over all possible outcomes when using all possible input operands. This is called a flat or uniform sum-space. The only requirement is that the residue function absolutely must be an n-state (256-state) reversible function. There is an immense number of possible outcomes. While one may keep using the carry propagating addition of 4 bytes (like the columns of the state array) one may expand it to 2 columns or 8 256-state elements or even addition of 16 256-state elements. Furthermore, one may apply this function transformation to all rounds or a single round or 2 or more rounds. One may apply different carry tables if one desires.

A practical issue may be to store different 256 by 256 state 256-state lookup tables. Such a table has 256*256 or 65536 256-state elements. In accordance with an aspect of the present invention, one or more self-propagating inverters are used to generate different carry tables. An original table may be stored as well as self-propagating inverters. The self-propagating inverter may be a 256-state inverter, which inverts the elements of the carry lookup table. The lookup table may be represented as a one dimensional array and shuffled. One may shuffle all the elements of the table with a 65536-state inverter or just parts of the array. One may also use techniques like using different state elements by using different word sizes as explained above. One may apply one n-state self-propagating inverter which preferably generates billions of unique inverters and use that to extract smaller state inverters. Or one may use 2 or more different self-propagating inverters to perform the modifications.

One may start the self-propagation with the initial self-propagation inverter itself. However, one may also start after p inversions. This has as effect that identical files, documents and/or multi-block plaintext will generate completely different ciphertext. This enables re-use of the self-propagating inverter by shifting its starting point. Different word divisions at re-use will further strengthen security. One may of course also use a completely different self-propagating inverter for different plaintext. The self-propagating inverter is particularly useful in multi-block plaintext in AES-CTR/GCM and ChaCha20 as each block uses identical parameters except a counter block, creating a fundamental weakness. The use of different inverters to modify functions such as AddRoundKey, and/or 32-bit word XORing and.or mod-2^32 addition in quarter-rounds in ChaCha20.

One may use the generated different inverters also as required elements in an FLT of an n-state operation. This may include the word-based XORing or any mod-n addition or n-state operation that is FLTed. These examples are the simplest to follow for illustrative purposes.

The MixColumns( ) operation in AES is represented as a matrix-vector multiplication over GF(256). In device implementation that means that the matrix is a 4 by 4 256-state array and the vector is a 1D array of 4 256-state elements and the operation is performed in accordance with the rules of a matrix/vector multiplication. The MixColumns( ) array in AES FIPS 197 is array [2 3 1 1;1 2 3 1;1 1 2 3;3 1 1 2]. This array is circulant respective to the first row. The design is explained in in the book/article Daemen and Rijmen. The Design of Rijndael, 2001 available for download from https://cs.ru.nl/~joan/papers/JDA_VRI_Rijndael_2002.pdf which is incorporated herein by reference. The array is selected based on several criteria among which is being Maximal Distance Separable (MDS) and thus also invertible. Daemen/Rijmen explain that they wanted a "maximum branching" operation. Preferably, the output and input vector (each of 4 bytes of 8 bits each) should have a maximum Hamming distance.

In accordance with an aspect of the present invention, the standard array in MixColumns( ) of AES is replaced with another array, preferably one using randomly generated 256-state elements, as the MixColumns operation is in essence described as a 256-state array-vector multiplication. In effect over GF(256). One may also modify the operation by FLTing the addition and multiplication that make up the array-vector multiplication. But modifying the array only or in combination with the FLT is also possible. To secure at least appropriate diffusion of symbols, one should preferably avoid rows and/or columns that have only zero-elements. Furthermore one should also preferably check if the modified operation performs an identity. That is that the output is identical to the input. Furthermore, like in other modifications, its maximal effect may be reached by applying it a limited number of AES rounds, only once or twice for instance. This makes attacks much more difficult.

In accordance with a further aspect of the present invention, one may also modify the ShiftRows operation in preferably a limited number of rounds. The ShiftRows( ) operation takes place on the rows of the state array in AES. One additional transformation is to apply an n-state inversion on all 16 bytes of the state array or a shuffling operation on the entire array, before and/or after the actual ShiftRows( ) step.

It was already explained that one may use self-propagating inverters to perform the element inversion and/or shuffling. This prevents the need to store massive numbers of inverters for encryption of plaintext that has many blocks. For each block one may apply an inverter that is generated from the base inverter in a self-propagating chain. This has further benefits as one may re-use these inverters by applying a different starting point. This creates different inverters for blocks of plaintext that are in identical block positions.

Preferably, one applies stored n-state base inverters that are used as self-propagating inverters. One may also generate n-state inverters that are derived from the secret parameters of encryption such as the key in AES and ChaCha20 and other encryption and hashing methods. The inventor believes that using pre-installed or underived inverters provide the most secure opportunity for increased security. However, the inventor also recognizes that for a wider and more incidental and mostly unplanned communication between two computing device it may not be possible and/or convenient to both obtain the same inverters, at least securely. In accordance with an aspect of the present invention, one may derive an n-state inverter from secret data such as the key, which has to be established anyway and which must be assumed secure. Again, this may not be possible under extreme attack situations, and in that case pre-installed secret inverters and/or keys may be the preferred approach.

A first observation between a difference between keys and n-state inverters is that 1) keys and n-state inverters may have different sizes, even in bit representation; and 2) a key, even of same size may have certain n-state elements more than once appearing or not appearing at all in the key. In an n-state reversible inverter all n-state elements appear exactly once. Thus a first step in accordance with an aspect of the present invention, is to expand an existing or computed key to the required size commensurate with the n-state reversible inverter. There are many secure algorithms that can do that. A simple way is using a hash like SHA-512 and do a repeat hash on generated hash and concatenate all hashes until the desired length is obtained. For instance 8 SHA512 hashes will generate 8*32 bytes in concatenated hashes which represents 256 256-state elements.

In accordance with an aspect of the present invention, the hexadecimal sequence of 256 bytes is converted into a sequence of 256 256-state elements. One then organizes the sequence in two arrays. A first array with rows with row index k starting with the corresponding 256-state elements followed by all positions that it occurs. So when the element 33 occurs 4 times in positions 4, 19, 101 and 233 it shows [33 4 19 101 233 0 0 0 0 0](Matlab does this simply with the 'find' instruction). The 0 indicating not occurring. So element 154 which doesn't occur at all has [154 0 0 0 0 0 0 0 0 0]. Also, an second array or sequence of elements that do not occur in the expanded sequence is created. The inventor created a Matlab program that goes through the arrays in the following way: it selects the first element that does not occur from the second array and goes to the first row in the first array that shows more than 1 occurrence of an element and replaces the second (or later the 'next') occurrence with the non-occurring element. After replacement the replaced position itself is replaced with a blocking code that indicates that the position is no longer available for replacement. The program thus works itself through the list of non-occurring elements in the second array, until all multiple occurrences beyond once are replaced with previously non-occurring elements. The inventor implemented this in Matlab. One can make several variations of the above, all with satisfactory results.

Figure 28:
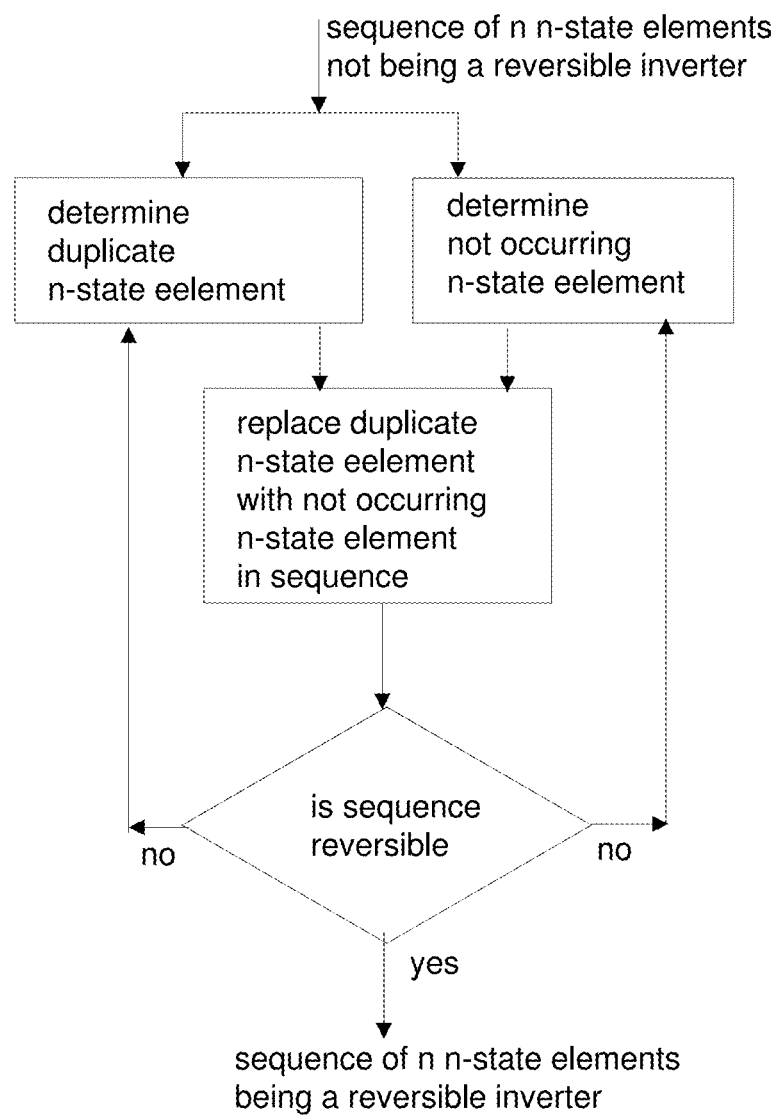
FIG. 28 illustrates an n-state sequence transformation in accordance with one or more aspects of the present invention.

A process of replacing duplicate n-state elements in a sequence of n n-state elements with non-occurring n-state elements is illustrated in FIG. 28. FIG. 28 is a flow diagram that reflects the instruction flow of a transformation of a sequence of n n-state elements that is not an n-state reversible inverter to an n-state reversible inverter. An actual executable Matlab program that performs such transformation is shown in screenshot in FIG. 25.

This works well as demonstrated by the following for a 25-state sequence:
  seq25=[23 9 24 24 15 3 10 7 7 6 1 23 12 15 8 25 25 25 17 19 9 14 7 18 20]
  The Matlab procedure named inv25=createReversibleInverter(seq25, 25), then creates inv25=[23 9 24 16 15 3 10 7 2 6 1 13 12 11 8 25 21 22 17 19 5 14 4 18 20].

Comparing the two(seq25 and inv25) shows how it works. One may modify the order, for instance always changing the first element in duplicates and maintaining the second occurrence. Other are possible and fully contemplated. One may check the correctness in Matab by doing a sort(inv25) which should be an identity. For very large sequences, such as n=256 or longer, one can check by generating test=1:n and then doing isequal(test,sort(invn)).

A variant program that extracts or generates a reversible k-state inverter from a random k-state sequence of k elements is shown in FIG. 25 as a screenshot of an Matlab program instructions. One aspect of this program is to maintain the first unique occurrence. One may change that is different ways, including adding a constant a mod-k to all unique elements and restart the procedure. Thus there are many different ways to generate k-state reversible inverters from a sequence of k-state elements in which elements occur more than once. It also shows that one may actually generate different k-state reversible inverters from the same sequence of k-state elements.

One may use the Key Expansion or Key Schedule of AES as a separate module to expand a key to a desired size. Standard in AES-GCM the key is expanded from k=16 to k=240 bytes. By resetting the for-loop in the key expansion one may generate 256 bytes. The inventor applied the above process to generate a key based 256-state sequence that is converted by the extraction program into a 240-state reversible inverter that may be used to shuffle the elements. Herein the extracted 240-state inverter may be applied as a self-propagating inverters. For instance up till the moment that a new session key is created. One may also extend the key schedule to expand to generate 256 bytes. And the thus generated sequence may be used in a similar way to create a reversible 256-state inverter, which may be used in an FLT or other inversions as described herein. It may also be applied as a the base in a self-propagating 256-state inverter.

In accordance with another aspect of the present invention, a k-state reversible inverter is generated from a k-state Feedback Shift Register (FSR), which is preferably a maximum length shift register. (MK-FSR). For instance, one may use Magma Calculator to determine a ML-FSR of 16-state elements. One such FSR may be determined by primitive polynomial $x^4+14*x^3+x^2+15*x+2$. One may convert this into transition matrix gal65536=[1 1 1 3;2 1116;1 2 1 2;11 2 15] which is provided in related Matlab origin-1 format of the Galois configuration array of the FSR. One may then apply the property of the ML-FSR that all shift register contents are unique. One starts for instance with start=[1 2 3 4](in origin-1 and runs vecn=gal65536*vecn for 65535 cycles, with vecn being initialized as start. It is well known that a k-state FSR with p shift register elements has $k^p-1$ unique states. The missing state is the all zero state or [1111] in Matlab. Thus one creates a sequence of 65536 unique words of 4 16-state elements by running the FSR for 65535 times and adding to the output words [1111]. One can simply modify the words into their decimal representation this creating a sequence of 65536 unique numbers which is of course a 65536-state reversible inverter.

Different (shifted) sequences are created by using different start points. Furthermore, the inverters are modified by selecting different insertion points for the all-zero elements word. Furthermore, the ML-FSR may be modified by a base-state (b=16 in this case) reversible inverter to apply an FLT upon the ML-FSR. One may also apply a Fibonacci configuration for the ML-FSR.

Another method to generate a large k-state reversible inverter is to apply a much larger q-state ML-FSR and select k words of the possible words. For instance, one may use a 16-state ML-FSR with words of 6 16-state words. Using Magma Calculator one may determine a primitive polynomial of degree 6 over GF(16). One example of a Galois transition array generated in this manner creates gal2=[1 111114;2 111116;1 2 111 3;1 1 2 11 2;111 2 18;1111 2 12]. In one illustrative embodiment one may run vecn=gal2*vecn, wherein vecn is initiated as [1 2 3 4 5 6] and run the FSR for 65535 cycles and capture only the first 4 elements of vecn and convert into a 65536-state element and also insert the [1111] equivalent element. This creates a sequence of 65536 elements, of which actually only 41,437 elements are unique. Call the thus generated sequence of 65536-state elements dec2 and do inv2=seq2invK(dec2, 65536); as illustrated in instructions in FIG. 25. Testing this inv2 confirms that it is a 65536 reversible inverter but drastically different from the earlier generated 65536-state inverter. One may create different 65536-state inverters this way by extracting different 16-state elements from generated words.

To illustrate the results of using the FSR approach, the first 25 65536-state elements of the generated 65536-state reversible inverters will be provided. Just 25 because the whole inverter of course has 65536 elements which is not helpful to be displayed for such a large number. The ML-FSR using a register of 4 16-state elements generates ultimately inv65536a=[292 25124 25620 25713 1608 60185 16185 12923 32642 10471 50925 46251 30701 49083 30558 37040 54272 55243 29147 31676 21508 26482 10602 7170 11999 . . . 1]. And the 6 16-state element FSR after applying the inverter extraction: inv65536b=[292 50872 51919 45271 60561 28051 47780 36717 44297 46763 38441 44189 12918 64831 37522 46420 38424 21127 64306 59439 45817 36842 38333 12776 48997 . . . 1]. Both start, for obvious reasons of the starting state, with 292, but diverge after that.

One of ordinary skill will recognize that additional modifications can be made, including using different FSRs of different lengths, using FLTs, modifying the sequence-to-inverter conversion. All of this indicates the ability to generate an enormous number of k-state reversible inverters from a limited starting point. Furthermore, the thus generated k-state reversible inverters may be applied as self-propagating k-state inverters.

The use of generating a 65536-state inverter is to apply such an inverter to shuffle an 256-state 256 by 256 function or lookup table as a shuffled table. This is useful in the use of modifying a staring random carry table as disclosed earlier herein. It was determined that the sum-space of a radix-n equivalent addition with a random carry table still leaves the outcome or sum-space uniform. Not using a repeat or many repeats of a certain implementation heightens security of cryptography. Especially in multi-block encryption, almost all blocks are encrypted using the same encryption parameters with exception of an often predictable counter. It will increase security when one secretly and undetectably or at least securely modifies at least a single operation. Changing for instance the 256-state random carry function at least every 10 or 20 blocks, but preferably for encryption of each block, will dramatically increase security. However, it is not very efficient to store 100s or millions or more 256 by 256 random tables. Thus shuffling a base table with a random k-state inverter will create greater security without the need for storing a large number of tables.

Furthermore, it is not needed to change the same aspect for all blocks. As disclosed above, there are many ways to modify generated key-stream per block, such as function FLT in AddRoundKey and MixColumns ShiftRows and SubBytes, as well as modifying the key schedule generation, both by inversion as shuffling. And one may modify (reversibly) the XORing of plaintext with keystream. One may also shuffle and/or invert the elements of the state array. And one may change the specific round that one wants to modify. In that sense, one may modify particularly processing intensive functions or tables directly after execution and have a processor core transform the related data or function while other cores are processing other modifications, to achieve a wide array of one may call just-in-time (JIT) transformation. This JIT transformation achieves an almost continuous CFT without substantially slowing down the processing but achieving modifications on an astronomical scale, like a factor 10^500 or greater, that is infeasible to detects and/or to successfully attack.

Above examples are illustrated in AES and particular AES-CTR/GCM. However, it is understood that these transformations may be used in other cryptographic applications such as encryption ChaCha20 and others, like finishers and participants in the Advanced Encryption Standard contest, in hashing such as SHA256/SHA512 and SHA3 and/or SHAKE variants. Furthermore, it was also shown that one or more transformations may be applied to current PKI methods like RSA and Diffie Hellman, both in classical and/or Elliptic Curve variants. One application is in function transformation in digital signature generation and verification. Recently NIST released novel post-quantum standards, like NIST FIPS-203 entitled Module-Lattice-Based Key-Encapsulation Mechanism Standard also called Kyber.

Kyber generates a key of size 32 bytes. In order to generate a k-state reversible inverter from a key or other sequence that is smaller than k one needs a key expansion application, generally known as a Key Derivation Function or KDF. Most KDFs apply a hash in repeat iterations to generate a longer sequence wherein the generated hashes are concatenated into a desired size. Among KDFs one may apply are bcrypt, HKDF (HMAC based), Argon2, scrypt, and/or PBKDF2, for instance. One may also use a hash like SHA-256 or SHA-512 or SHA-3 variations in sufficient iterations. Unfortunately, attackers are building enormous libraries or rainbow tables in order to crack hashes. One way to create a more secure expanded sequence is by varying expansion steps for parts of the expanded sequence. That is SHA-512 for a first series of 512 bits, followed by SHA-3 512 for the next 512 bits then again SHA-512 and so on.

Yet another way is to modify SHA-512 or SHA-256 in accordance with a transformation as disclosed earlier, for instance by FLT of the bitwise XOR function as applied in SHA or the mod-$2^{32}$ addition, per FLT. One may use for each block generation a different inverter generated by a self-propagating inverter as explained herein. Such a varying generation method may be applied if one is not entirely sure about the security of an initial key.

One may wonder if the astronomical possible variations are really necessary. The inventor's answer to that is positively: yes, The current Advanced Persistent Threat (APT) attacks, where attackers observe in-cloud users for long periods, it may be assumed, no, it should be assumed that all cryptography for that account in that specific server is compromised. That means that even Private Circuit cloud may not be secure. Furthermore, attacks one existing encryption are improving, while enormous libraries on key and other parameter libraries are probably being established. Unfortunately this means that the standard encryption one relies on may not be as secure as assumed. Furthermore, the current Harvest Now Decrypt Later attacks indicate confidence by attackers that ciphertext can be broken in the future. This means that security has to be improved now, if one wants to be sure that harvested ciphertext will not be broken in the next decade. Furthermore, it seems that the burden of data security is increasingly shifted to the data owner. In that case, the data owner better provides the best protection for data on their own and not rely on (potentially at risk) standard encryption. The above novel methods disclosed provide significant additional protection that may protect encrypted data for at least the next 10-20 years.

There are different ways to activate the above security improvements. One way is to let all data leave a private network into the cloud or enter a private network from the cloud though a computer or network server behind a firewall. This server or computer may have pre-programmed the required parameters. One may create a coding scheme that determines what modification parameters are used and how they are applied, including initial settings, rounds to be affected. which function or multiple functions are transformed, derivation of expanded keys and inverters and the like. This may form a vector of numbers and/or codes that indicate a variation. For example a code of which a hash may be created indicates [5, 4, 9, 22, . . . ] and means using 5 iterations of a self-propagating inverter (code 5), to modify with FLT AddRoundKey bitwise XOR (code 4), in round 9. for block 22 in AES-GCM. The length of the code interpretation can be a vector of up to 100, 1000 or even 10000 meaningful elements. They may be managed by a Key Management System. For computers somewhat unknown connected via an application, one may share procedures using the codes but that may use PKI based key exchange to derive required parameters such as inverters from secure keys, as disclosed herein.

The herein taught modifications in general preserve the architecture of proven and well tested cryptographic devices and methods. They also modify the implementation of such method in such a way that the numerical output of the related transformed cryptographic operation is modified with a factor of change that may be an astronomical factor $10^{\wedge}500$ or greater. The modification, due to preserving the base architecture does not leak or reveal itself in the output such as plaintext or hash, which will preserve its statistically random character.

In one embodiment of the present invention one may use a Maximum Length Feedback Shift Register application, which may be modified by FLT, to generate a content of 32 bits (like 4 256-state FSR or a 8 elements 16-state FSR) to realize a non-linear incrementing counter in multi-block AES-CTR/GCM or ChaCha20 for instance.

The herein disclosed modified and novel computer functionality is expressly used in cryptographic modification of data signals transmitted between at least 2 different computing devices. The cryptographic application may be an encryption, a decryption, a hashing, a digital signature generation and/or a digital signature verification. Data is processed in a first device and then in its processed form transmitted to a second device. This may be as simple as a local computer using a processor (the first device) with memory to create encrypted data or a hash, and transmit the encrypted data or the hash to a storage device like a hard disk or a flashdrive which may be removable. It may also be that the processed data (ciphertext and/or hash and/or signature) is transmitted via a network to a remote device such as a server or a receiving computer. A computing device may also receive processed data or retrieve data from another device and processes the received data to for instance decrypt encrypted data and/or re-computes a hash and compares it with a received hash and/or verifies a signature accompanying a digital file, or any other relevant cryptographic operation.

Thus the cryptographic operations and devices as described herein provide security in data storage, reception and transmission between computing devices. Furthermore, the requirements of speed of exchange and the limited waiting time that is available, the devices and/or methods as taught herein work with a speed equivalent to processing at least 1000 bits per second and preferably much faster. There are several measurements known in the literature. For example, using hardware acceleration (such as Intel's AES-NI), AES-128 can achieve speeds of around 3 GB/s. This means that encrypting a typical internet packet (which is around 1,500 bytes) would take approximately 0.5 microseconds (0.0005 milliseconds). At any rate, the required speed as well the requirement to transmit the cryptographic data between computing devices over a physical channel, preferably an electro-magnetic field enable channel, or even a quantum-mechanical enabled channel, requires processing speeds that cannot be achieved reasonably by any human or even multiple humans even when using paper and pencil. Thus the herein disclosed and later claimed aspects of the present invention pertain strictly to machine or computer executed functionality.

Figure 26:
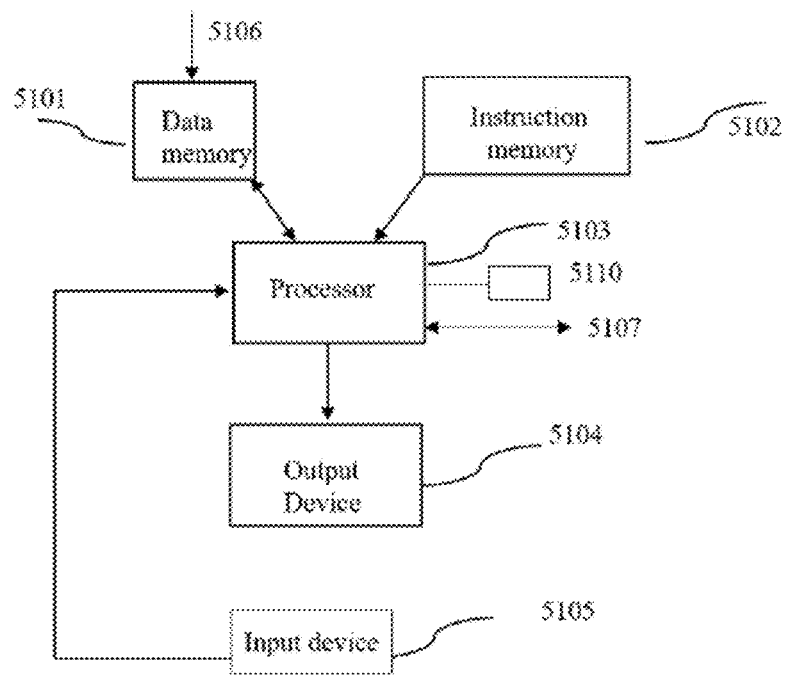
FIG. 26 is an illustrative diagram of a computing device.

A computing system illustrated in FIG. 26 and as described herein is enabled for receiving, processing and generating data. The system is provided with data that can be stored on a memory 5101. Data may be obtained from a sensor or may be provided from a data source. Data may be provided on an input 5106. The processor is also provided or programmed with instructions executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102, including FPGAs and discrete components. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 26 provides a system for data processing resulting from a sensor or any other data source and is enabled to execute the steps of the methods as provided herein as an aspect of the present invention. This is a illustrative example of a computing system. One may also have a computing system that is a dedicated custom circuit with discrete components either of a circuit board or on an integrated circuit. The system may also be realized as a Field Programmable Gate Array or ASIC or any other circuit that performs computing capability.

Figure 27:
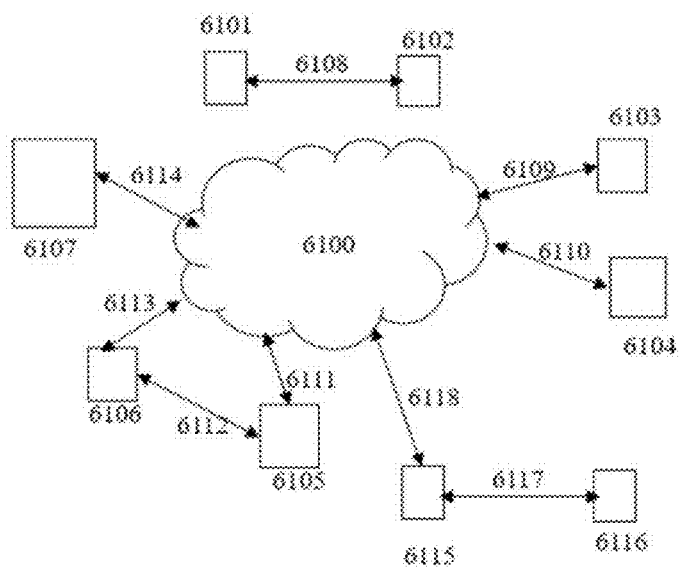
FIG. 27 is a diagram illustrating a network.

A computing device or system often work in a network or interconnection. FIG. 27 illustrates a possible network configuration. FIG. 9 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bidirectional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

In one embodiment of the present invention 6115 may be a gateway server and 6116 may represent one or more devices connected to the cloud through gateway server 6115 that may implement machine cryptography as disclosed herein.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a computer, a PC, a smartphone, a tablet, a processor and the like to monitor and/or control an IoT (Internet of Things) device 6104 with a processor such as a camera, a medical device, a security device such as a lock or fire monitor, a thermostat, an appliance, a vehicle or any other device.

Terms like hash, signature, ciphertext, plaintext and the like have been used herein. The purpose is to describe the role of the related data. But these are of course in the sense of computer technology messages or signals that are being transferred between computing devices generally connected through a network. However, data or messages may also carried on a storage device, such as a memory stick, a hard drive, an optical drive a portable device such as a laptop or a smartphone or a tablet and transferred from these devices to another device. Machine cryptography as described herein is applied to protect security and/or authentication of messages, data and/or devices.

The article "a" herein means "one or more" unless explicitly used to mean one (1). Without such an explicit designation "a" means one or more.

A memory herein is a technical device that stores data that may be retrieved from the memory by a processor. A memory may be permanent such as a Read Only Memory, a programmable memory a random-access memory, an addressable memory or any other device that is used to store data and retrieve data from. That includes devices that may also be named storage devices such as tape drives, magnetic disks and optical disks for instance.

Cryptography as applied herein is machine or computer implemented cryptography. It processes data into cryptographic data that may be captured and/or processed by unauthorized machines or computers. The size of data, such as messages or files, is such that processing by hand of this data with required speed and volume, even with many people even with using paper and pencil is practically impossible. For instance one may require a processing speed of at least 100,000 8-bit equivalent symbols per second. Furthermore, the herein described cryptographic methods make it infeasible to effectively and successfully recover the hidden information from transmitted data within at least 100 hours of computer based attacks. Thus the herein disclosed methods and devices ensure security of transmitted data and/or validates the origin of the cryptographic data.

FIPS documents are Federal Information Processing Standards issued through the National Institute of Standards and Technology in Maryland. NIST also issues Special Publications which are recommendations on cryptography. It is assumed that one of ordinary skill in the art of cryptography is familiar both with the content of FIPS and SP documents issued by NIST. In that sense it seems superfluous to mention all FIPS documents. However, to prevent what is believed unreasonable objection to this assumption, the following NIST documents are incorporated in their entirety herein: FIPS 180-4, FIPS 186-4, FIPS 197, FIPS 202, FIPS 203, FIPS 204. Furthermore, NIST Special Publications SP 800-38A SP 800-38B, SP 800-38C, SP 800-38D, SP 800-38E and SP 800-38F are also incorporated herein by reference in their entirety. ChaCha20 is fully described in for instance RFC 7539 which is incorporated herein by reference in its entirety.

Disclosed herein are novel Computational Function Transformations (CFT) in Computer Implemented Cryptography. Classical and basically secure cryptographic methods and devices are analyzed and certain computational functions are transformed thus generating unpredictable results that make the generated output more secure. The CFT may apply to a function per se that retains its meta-properties, or sequences of data internally are modified completely or largely retaining statistical properties. One may thus increase security of standard cryptographic methods and protect against future breaking of cryptographic data by for instance quantum computers and protect data against theft of parameters such as keywords. One may also apply the CFT to diminish sizes of parameters while maintain if not increasing overall security. CFT therefore is useful as it increases security of data transfer over the Internet and/or storage of confidential data in Cloud servers at minimal increase in complexity and may protect unauthorized access to data for at least 20 years as brute force attacks, based on complexity of brute force attacks, will not be successful with all currently available computer power in the world during the expected lifetime of the universe.

Documents are incorporated herein by reference. They are incorporated herein by reference in their entirety. Aspects of the presents invention teach novel and non-obvious transformations of operations and devices. If an aspect described is described in the document that is incorporated by reference but not in the current specification, this means not that the aspect is omitted. Only when it is explicitly omitted or it is explicitly modified should this aspect be considered to be different from the incorporated source. The intent of modification is explicit herein. As explained earlier, the tried and tested architecture of cryptographic methods and devices is largely maintained. But the computational implementation is transformed, thus creating novel computational functionality.

Aspects of the current inventions are in machine cryptography and pertain in general to create transformations of computational functions in known, novel as well as standard based machine cryptography. The transformations are designed to preserve the base architecture, which is often proven and well tested, of a cryptographic method but modify the computational implementation (or computational logic), at least to an extent that the statistical outputs are not substantially or detectably changed. In cryptographic terms that means that the modifications by themselves do not reveal or leak into the often publicly transmitted or accessible data.

The modifications often apply what are called n-state reversible inverters herein. A reversible n-state inverter is a sequence of n different n-state elements. For convenience of display and processing, the n-state data elements in an n-state reversible are represented as being selected from a set of consecutive integers or natural numbers such as $\{1, 2, \ldots, n\}$ or $[0, 1, 2, \ldots, n-1]$. This is for representation and other schemes in representation may be applied. An n-state reversible n-state inverter has a reversing n-state inverter with the combination of n-state reversible inverter and reversing inverter being identity.

It was already explained earlier that a computer does not know numbers, but only data elements, usually bits. Numbers in computers are processed as series or words of bits. Thus when a term n-state element or n-state data element is used herein, it is intended to be representing a set, series or word of bits that are processed. Furthermore, n-state computational functions are executed by computational hardware function, which may include the use of one or more addressable lookup tables.

Several terms are used herein that have a well defined meaning, especially because the inventor may be his own lexicographer. One term used herein is the term Finite Lab Transform or FLT. This means that a 2-operand operation is modified as explained in FIG. 1. The FLT may be implemented as such with the n-state inverters. One may also for convenience create a lookup table that represents the outcome of an FLT by using all possible input operands. This makes an implemented FLT extremely fast. One may then call the result of applying the FLT an FLTed function or FLTing a function.

A function herein is a computational function realized by physical elements. While being represented as a table or even mathematical expressions, all functions herein still are computer functions and as investigated by the inventor appear to be unique.

One aspect of the current invention is the transformation of a carry-less function (represented as an addition over $GF(2^k)$) into a carry propagating function. A carry propagating function herein may be called a radix-n function. It is based on a carry ripple adder structure wherein an addition is performed by a combination of a residue and a carry function on n-state elements. But the radix-n operation herein may be different that it applies a complete random looking carry function and the carry and residue generating functions may be modified based on n-state inverters.

The transformations as disclosed herein may cause enormous numbers of variations, often larger than 1-^500 and even larger than $10^{1500}$. While seemingly fantastic, these great numbers of variations are a result of what may be called combinatorial explosion. That is when n is of a significant size the variations are determined by numbers in the order of factorial of n (n!), n^n, and n^(n^2). These numbers for n=256 are just astronomical and are not a fantasy of the inventor.

One reason for creating the disclosed methods and devices for cryptographic modifications is an almost singular focus on Post Quantum (PQ) PKI based on the quantum computer threat to the classical or widely applied public key exchange of PKI methods, such as RSA, DH based methods and ECC based PKI. However, this ignores the (future) threat to the commonly used symmetric encryption such as AES and ChaCha20. The thereat to these methods may not directly come from quantum computers but rather from clever hacker attacks. Applying the herein provided methods provide a huge barrier against breaking encrypted data. Especially because even stealing keys will not enable an attacker to successfully break the transformed methods. This may require keeping computing devices that perform the transformations behind a firewall, so that the transformation itself it never exposed in cloud servers and preferably not to internal clients in a network behind the firewall. Management of the transformations is largely a management of the required n-state inverters, which may be done by classical key management systems.

The highest security may be obtained by custom installation of n-state inverters or their seeds on participating computing devices. Which may be a challenge in much of current Internet data exchange wherein connections are established on an ad hoc basis using PKI. To that end, the inventor invented a novel way of what may be called PKI based generation of n-state reversible inverters. The required n-state inverters may require 256-state reversible inverters or even much larger values of n. In accordance with several aspects of the present invention, one or more methods and devices are taught herein that transform a sequence of n n-state elements which is NOT a reversible n-state inverter, into a reversible n-state inverter. Examples are provided. Furthermore, one may not want to store or prepare dozens, thousands or millions of different n-state inverters. The use of self-propagating n-state inverters with may generate billions of different n-state inverters are disclosed.

Furthermore, it is undesirable to change an infrastructure to transmit key-like 256-state inverters or sequences in the current PKI, where 16 or 32-byte keys are the norm. The inventor disclosed the use of KDFs and/or Key Expansion functions that expand (in a seemingly random way) a relative small key of for instance 16 or 32-bytes or 64 bytes into a larger sequence for instance being 256 or more bytes. The thus generated n-state sequences that most likely are not n-state inverters are then transformed into n-state reversible inverters. This was demonstrated for n=65536, showing that this by itself is not a computational problem.

This means that one may apply the current PKI to achieve the required variations and astronomical number of possible variations and/or transformations. Concerns about quantum computer attacks may be addressed by using PQ PKI as disclosed in FIPS 203 and/or FIPS 204 if one prefers a signature-like approach.

Extraction of an n-state reversible inverter from a sequence of n n-state elements with duplicative occurring n-state elements was disclosed above. Because of the nature of the seed and the random character of possible expansion, it is infeasible for an attacker to create the sequence from which the inverter was extracted. However, in one embodiment the non-occurring elements are processed from low to high. One may change this for instance from high to low, or first odd and then even or any other rule. Such rules may be changed with each extraction.

The Finite Lab-Transform or FLT is a patented invention by the inventor of the aspects of the present invention. It is extensively described in U.S. patent application Ser. No. 18/097,396 filed on Jan. 16, 2023, which is incorporated herein by reference. It was also disclosed in U.S. patent application Ser. No. 15/442,556 files on Feb. 24, 2017 and issued on Dec. 24, 2019 as U.S. Pat. No. 10,515,567 which are both incorporated herein by reference.

Aspects of the present invention relate to data elements that may be represented as n-state elements or words of bit for instance that represent a value n. Aspects of the present invention apply to very large data elements, like elements represented by 256 bits or more. To present the explanations provided herein in an understandable manner, often illustrate examples for small n like 3 bits (or k=3 bit words n=2^3) are used. This may appear as not creating many variations. One is cautioned that the so called "combinatorial explosion" may kick in for larger values of n. For n=4 there are 24 different 4-state reversible inverters, for n=8 there are 40,320 different 8-state eversible inverters, and for 8 bits or n=256 there are over 10^500 different 256-state inverters.

All numerical examples have been executed in working computer programs, mots in Matlab. However, providing a 65536-state reversible inverter is confusing and only its beginning and ending have been included. However, the Dell Computer on which an old version of Matlab was installed had no problems in rapid execution, in that case using a stored look-up table. One of ordinary skill is able to repeat the computations based on the details provided herein.

For convenience the computer language Matlab has been applied in demonstrating aspects of the present invention. This Matlab language is close to pseudo-code and easy to understand for one of ordinary skill. However, all aspects are implementable in other computer languages, including Machine Language, Assembly Language, Interpreted Languages and Compiled Languages. This may include C, C++, Java, Python, Rust, Mathematica, Go, C#, Ruby, Magma as illustrative but non-limiting examples.

Matlab is know for its speed in array or matrix processing. However Matlab's array indexing works from starting index 1 (origin-1) instead of index 0 (origin-0). This is by itself not an issue and actually illustrates that the computations performed in Matlab using lookup tables or otherwise implemented switching tables have no inherent mathematical meaning, but are only meaningful in providing a state transformation, which is a machine property.

The above modifications and/or transformations, which may be named Computational Function Transformation (CFT), preserve the basic architecture of a cryptographic method, while its effective function implementation is transformed. It is based on the computer design framework as articulated by Prof. Dr. Gerrit "Gerry" Blaauw (architecture/implementation/realization). As a consequence a statistical analysis of the modified cryptographic data in for instance ciphertext does not reveal or leak information about a change. There is a growing need for more secure cryptography especially in encryption, but also hashing and digital signatures. Other efforts to improve for instance encryption security involve larger keys, larger state arrays and/or more execution of rounds. This may change the basic and proven architecture and in general requires significant re-design of existing methods and may place greater demands on computation power, code re-design and/or execution time, which may not achieve optimal performance and with limited control by data owners. These issues are either circumvented or addressed by the devices and methods disclosed herein as one or more aspects of the present invention.

One of ordinary skill reviewing the methods and/or devices disclosed herein is expected to have sufficient computer programming skills to code or recode the instructions provided herein and have a working knowledge of implementing cryptographic standards as publicly available as Request For Comments (RFC) issued by the Internet Engineering Task Force (IETF) and Federal Information Processing Standards (FIPS) and Special Publications as released by the National Institute of Standards and Technology (NIST), for instance or other standard bodies.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention.

The invention claimed is:

1. A computer-implemented method for generating cryptographic data, comprising:
   determining by one or more processors, in a sequence of n n-state data elements with n being an integer greater than 3, the sequence of n n-state data elements not being an n-state reversible inverter, n-state elements that occur more than once;
   determining by the one or more processors, in the sequence of n n-state data elements which of one or more n-state elements do not occur;
   creating a new sequence of n n-state elements based on replacing in the sequence of n n-state data elements an n-state element that occurs more than once in the sequence of n n-state elements with an n-state element that does not occur in the sequence of n n-state data elements and repeating the replacing until the new sequence is a first n-state reversible inverter;
   transforming, by the one or more processors, one or more n-state data elements in a cryptographic operation based on the first n-state reversible inverter, the cryptographic operation is selected from the group consisting of an encryption, a hashing, a public key exchange and a digital signature generation; and transmitting, by the one or more processors, data generated based on the cryptographic operation on a physical channel to a second computing device.

2. The computer-implemented method of claim 1, further comprising:
generating by the processor, the sequence of n n-state elements from a sequence of k n-state data elements, with k being an integer smaller than n.

3. The computer-implemented method of claim 2, wherein the sequence of n n-state data elements is generated with a published Key Derivation Function (KDF) with the sequence of k n-state data elements as input.

4. The computer-implemented method of claim 2 wherein the sequence of n n-state data elements is generated by a modified Advanced Encryption Standard Key Expansion method with a key of k n-state data elements as input.

5. The computer-implemented method of claim 2, wherein the sequence of k n-state data elements is a key determined by a Public Key Infrastructure (PKI) operation.

6. The computer-implemented method of claim 5, wherein the sequence of k n-state elements is a sequence of 32 bytes generated by a Kyber method, as specified in the National Institute of Standards and Technology publication FIPS-203.

7. The computer-implemented method of claim 1, further comprising:
generating by the processor a next n-state reversible inverter based on the first n-state reversible inverter.

8. The computer-implemented method of claim 1, further comprising:
the cryptographic operation including a bitwise XORing of words of bits that is modified based on the first n-state reversible inverter in accordance with a Finite Lab-Transform (FLT).

9. The computer-implemented method of claim 1, wherein:
the cryptographic operation is selected from an encryption defined by published standards pertaining to one of Advanced Encryption Standard Counter Mode (AES-CTR) and Advanced Encryption Standard Galois Counter Mode (AES-GCM) and an operation defined as a bitwise XORing of words of bits is replaced by an operation including an n-state carry function.

10. The computer-implemented method of claim 1, wherein:
the cryptographic operation is selected from an encryption defined by published standards pertaining to one of AES-CTR and AES-GCM including processing modules Key Expansion( ), SubBytes( ), ShiftRows( ), MixColumns( ), and AddRoundKey( ) and at least one of the modules is modified based on the first n-state reversible inverter.

11. The computer-implemented method of claim 1, wherein the first n-state reversible inverter is applied in a Finite Lab-Transform, and/or a data element inversion and/or a reversible data shuffling.

12. The computer-implemented method of claim 1, wherein:
the cryptographic operation is selected from an encryption defined by a published standard pertaining to one of ChaCha20, XChaCha20 and Salsa20 including processing of words of 32-bits by XORing of words of 32-bits and addition of words of 32-bits modulo-$2^{32}$ and the processing is modified based on the first n-state reversible inverter.

13. The computer-implemented method of claim 1, wherein the transforming of n-state data elements is implemented for a number of rounds smaller than a total number of rounds of the cryptographic operation.

14. A computing device for generating cryptographic data, comprising:
one or more memories enabled to store data and retrieve data, including instructions;
one or more processors enabled to retrieve one or more instructions from the one or more memories which, when executed by at least one of the one or more processors, causes steps to be performed comprising to:
determine in a sequence of n n-state data elements with n being an integer greater than 3, the sequence of n n-state data elements not being an n-state reversible inverter, n-state elements that occur more than once;
determine in the sequence of n n-state data elements which of one or more n-state elements do not occur;
create a new sequence of n n-state elements based on replacing in the sequence of n n-state data elements an n-state element that occurs more than once in the sequence of n n-state elements with an n-state element that does not occur in the sequence of n n-state data elements and repeating the replacing until the new sequence is a first n-state reversible inverter;
transform one or more n-state data elements in a cryptographic operation based on the n-state reversible inverter, the cryptographic operation is selected from the group consisting of an encryption, a hashing, a public key exchange and a digital signature generation; and
transmit data generated based on the cryptographic operation on a physical channel to a second computing device.

15. The computing device of claim 14, further comprising further program instructions that when executed, cause the computing device to:
generate the sequence of n n-state elements from a sequence of k n-state data elements, with k being an integer smaller than n.

16. The computing device of claim 15, wherein the sequence of n n-state data elements is generated with a published Key Derivation Function (KDF) with the sequence of k n-state data elements as input.

17. The computing device of claim 15, wherein the sequence of n n-state data elements is generated by a modified Advanced Encryption Standard Key Expansion method with a key of k n-state data elements as input.

18. The computing device of claim 15, wherein the sequence of k n-state data elements is established based on a Public Key Infrastructure (PKI) operation.

19. The computing device of claim 14, further comprising further program instructions that when executed, causes the computing device to generate by the processor a next n-state reversible inverter based on the first n-state reversible inverter.

20. The computing device of claim 14, wherein the cryptographic operation includes a bitwise XORing of words of bits that is modified based on the n-state reversible inverter in accordance with a Finite Lab-Transform (FLT).

* * * * *